United States Patent
Jeon et al.

(10) Patent No.: US 11,076,348 B2
(45) Date of Patent: Jul. 27, 2021

(54) METHOD OF NEIGHBOR DISCOVERY AND WIRELESS INTER-CONNECTION FOR CELLULAR MESH NETWORK

(71) Applicant: Samsung Electronics Co., Ltd., Suwon-si (KR)

(72) Inventors: Jeongho Jeon, San Jose, CA (US); Vishnu Vardhan Ratnam, Plano, TX (US); Joonyoung Cho, Portland, OR (US); Hao Chen, Allen, TX (US); Jianhua Mo, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/732,232

(22) Filed: Dec. 31, 2019

(65) Prior Publication Data
US 2020/0221373 A1 Jul. 9, 2020

Related U.S. Application Data

(60) Provisional application No. 62/787,823, filed on Jan. 3, 2019, provisional application No. 62/787,833, filed (Continued)

(51) Int. Cl.
*H04W 48/16* (2009.01)
*H04W 76/10* (2018.01)
*H04W 48/02* (2009.01)

(52) U.S. Cl.
CPC .......... *H04W 48/16* (2013.01); *H04W 48/02* (2013.01); *H04W 76/10* (2018.02)

(58) Field of Classification Search
CPC ...... H04W 48/16; H04W 48/02; H04W 76/10
(Continued)

(56) References Cited

U.S. PATENT DOCUMENTS

| 7,706,337 B2 | 4/2010 | Pandey et al. |
| 7,787,362 B2 | 8/2010 | Xu |

(Continued)

FOREIGN PATENT DOCUMENTS

WO 2014/148801 A1 9/2014

OTHER PUBLICATIONS

Notification of Transmittal of the International Search Report and the Written Opinion of the International Searching Authority, or the Declaration dated Apr. 10, 2020 in connection with International Patent Application No. PCT/KR2020/000125, 11 pages.

*Primary Examiner* — William Nealon

(57) ABSTRACT

Methods and apparatuses for neighbor discovery and wireless inter-connection in a wireless communication system. A method for operating a base station (BS) in the wireless communication network includes generating measurement information regarding neighboring BSs of the BS in the wireless communication network; determining a first parent BS of the neighboring BSs to connect to based on the measurement information; performing an initial access procedure with the first parent BS to connect to the first parent BS; identifying an end-to-end route for the BS for transfer of data between a user equipment (UE) and a gateway via the wireless communication network; and transferring the data between the gateway and the UE based on the identified end-to-end route.

20 Claims, 22 Drawing Sheets

Related U.S. Application Data on Jan. 3, 2019, provisional application No. 62/787,837, filed on Jan. 3, 2019.

(58) Field of Classification Search
USPC .......................................................... 455/434
See application file for complete search history.

(56) References Cited

U.S. PATENT DOCUMENTS

| | | | | |
|---|---|---|---|---|
| 7,899,027 | B2* | 3/2011 | Castagnoli | H04L 45/20 |
| | | | | 370/350 |
| 2006/0109787 | A1* | 5/2006 | Strutt | H04L 45/125 |
| | | | | 370/235 |
| 2010/0322141 | A1* | 12/2010 | Liu | H04W 24/10 |
| | | | | 370/315 |
| 2012/0127883 | A1* | 5/2012 | Chang | H04L 43/08 |
| | | | | 370/252 |
| 2016/0192439 | A1* | 6/2016 | Phuyal | H04L 5/0048 |
| | | | | 370/315 |
| 2018/0124859 | A1* | 5/2018 | Cho | H04W 36/0009 |
| 2018/0324678 | A1 | 11/2018 | Chen et al. | |
| 2018/0343156 | A1* | 11/2018 | Malik | H04L 5/0048 |

\* cited by examiner

METHOD OF NEIGHBOR DISCOVERY AND WIRELESS INTER-CONNECTION FOR CELLULAR MESH NETWORK

CROSS-REFERENCE TO RELATED APPLICATIONS AND CLAIM OF PRIORITY

The present application claims priority to U.S. Provisional Patent Application No. 62/787,823, filed on Jan. 3, 2019; U.S. Provisional Patent Application No. 62/787,833, filed on Jan. 3, 2019; and U.S. Provisional Patent Application No. 62/787,837, filed on Jan. 3, 2019. The content of the above-identified patent document is incorporated herein by reference.

TECHNICAL FIELD

The present application relates generally to wireless communication systems, more specifically, the present disclosure relates to neighbor discovery and wireless inter-connection in an advanced wireless communication system.

BACKGROUND

A communication system includes a downlink (DL) that conveys signals from transmission points such as base stations (BSs) to reception points such as user equipments (UEs) and an uplink (UL) that conveys signals from transmission points such as UEs to reception points such as BSs. Increasing the deployment density of BSs is a way to increase data throughputs, via spatial reuse of frequencies. In fact, such spatial reuse has been one of the main contributors for increase in system throughput since the early days of cellular communication. While improving spatial reuse, a dense BS deployment may be inevitable at millimeter wave (mm-wave) and terahertz (THz) frequencies to improve coverage, by compensating for the pathloss and blockage. However, the deployment locations and density of conventional BSs is limited by the availability of expensive fiber backhaul.

SUMMARY

The present disclosure relates neighbor discovery and wireless inter-connection in an advanced wireless communication system.

In one embodiment, a BS in a wireless communication network is provided. The BS includes a processor configured to a processor configured to generate measurement information regarding neighboring BSs of the BS in the wireless communication network, determine a first parent BS of the neighboring BSs to connect to based on the measurement information, perform an initial access procedure with the first parent BS to connect to the first parent BS, and identify an end-to-end route for the BS for transfer of data between a UE and a gateway via the wireless communication network. The BS also includes a transceiver operably connected to the processor, the transceiver configured to transfer the data between the gateway and the UE based on the identified end-to-end route.

In another embodiment, a method for operating a BS in a wireless communication network is provided. The method includes generating measurement information regarding neighboring BSs of the BS in the wireless communication network; determining a first parent BS of the neighboring BSs to connect to based on the measurement information; performing an initial access procedure with the first parent BS to connect to the first parent BS; identifying an end-to-end route for the BS for transfer of data between a UE and a gateway via the wireless communication network; and transferring the data between the gateway and the UE based on the identified end-to-end route.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
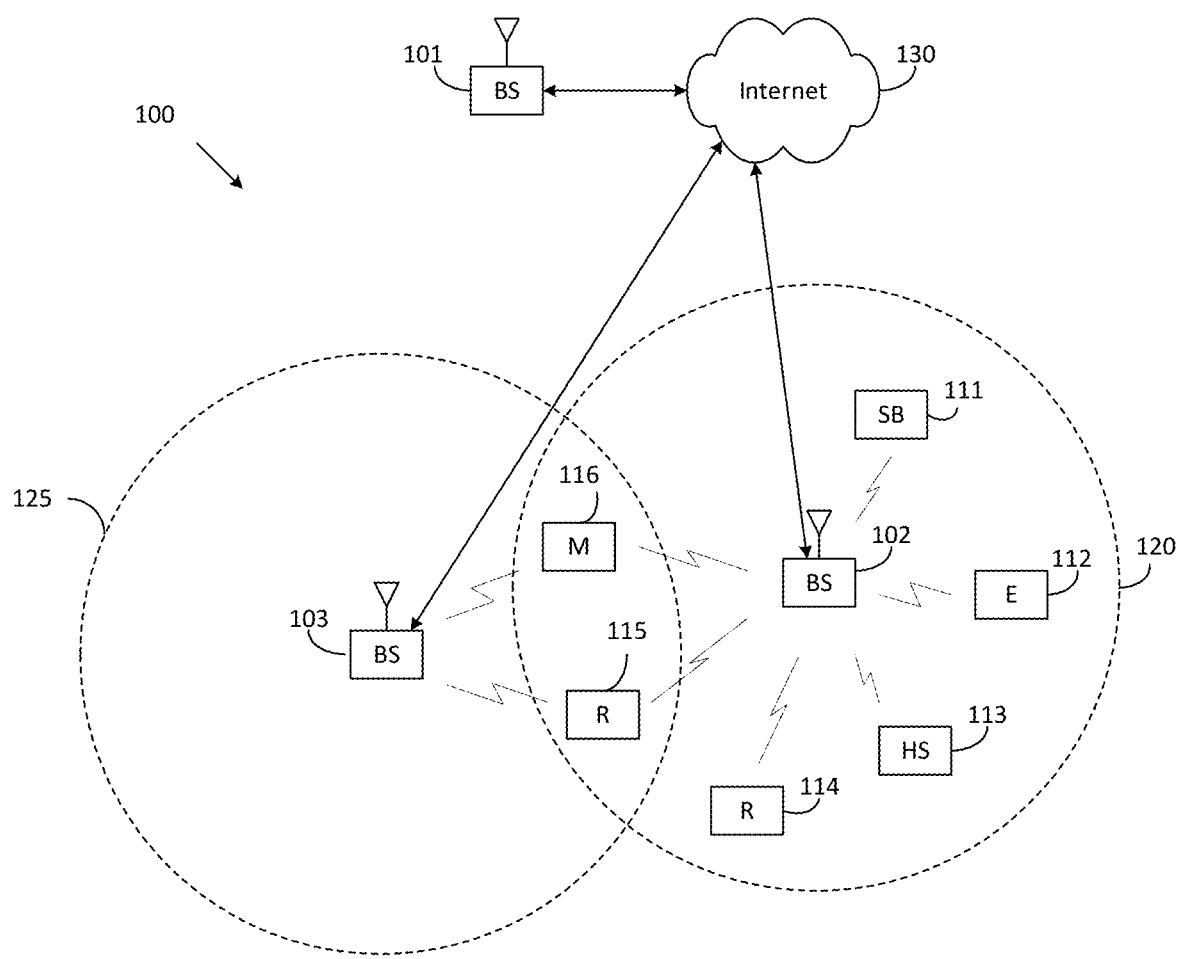
FIG. 1 illustrates an example wireless network according to embodiments of the present disclosure.
Figure 2:
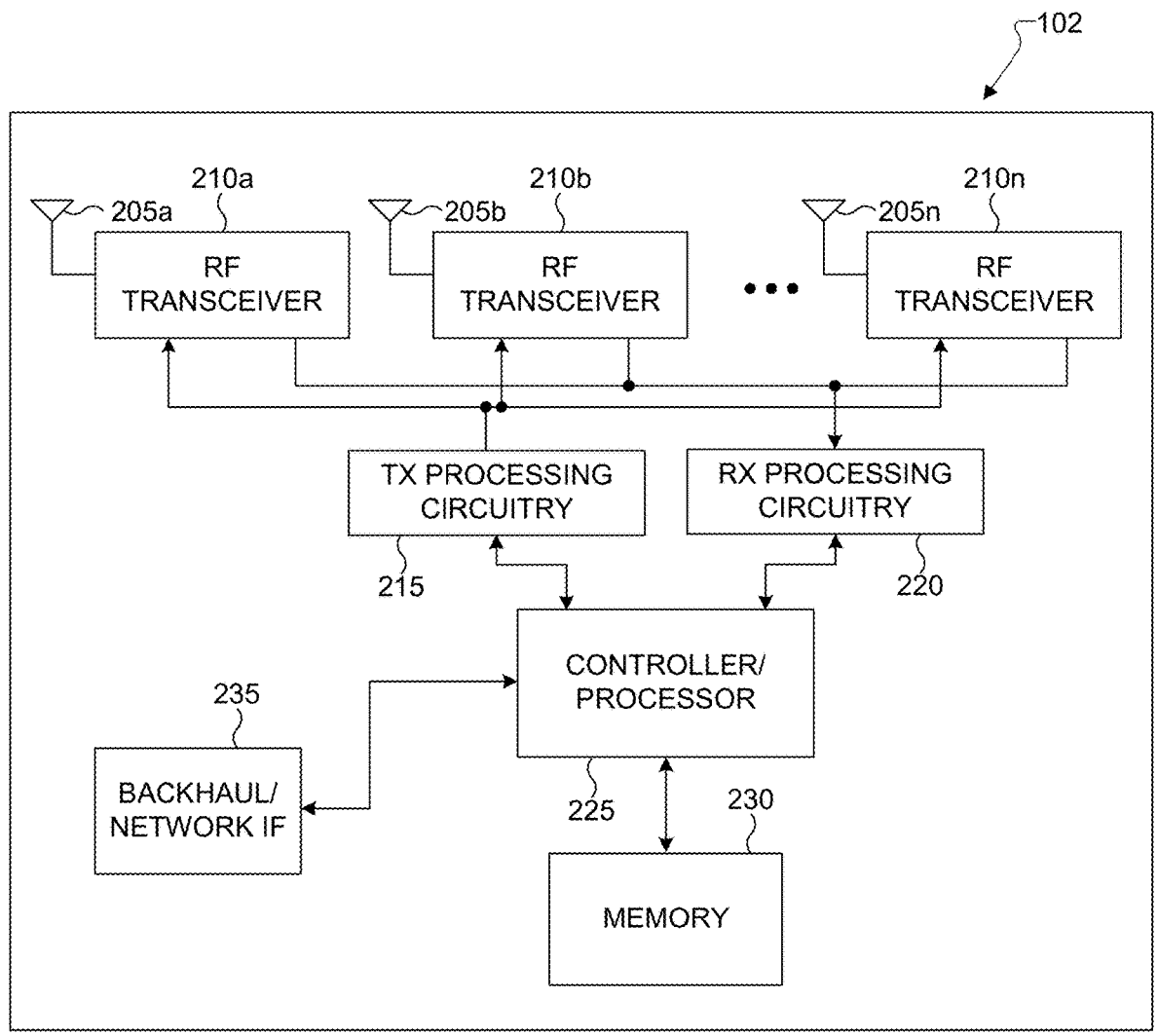
FIG. 2 illustrates an example gNB according to embodiments of the present disclosure.
Figure 3:
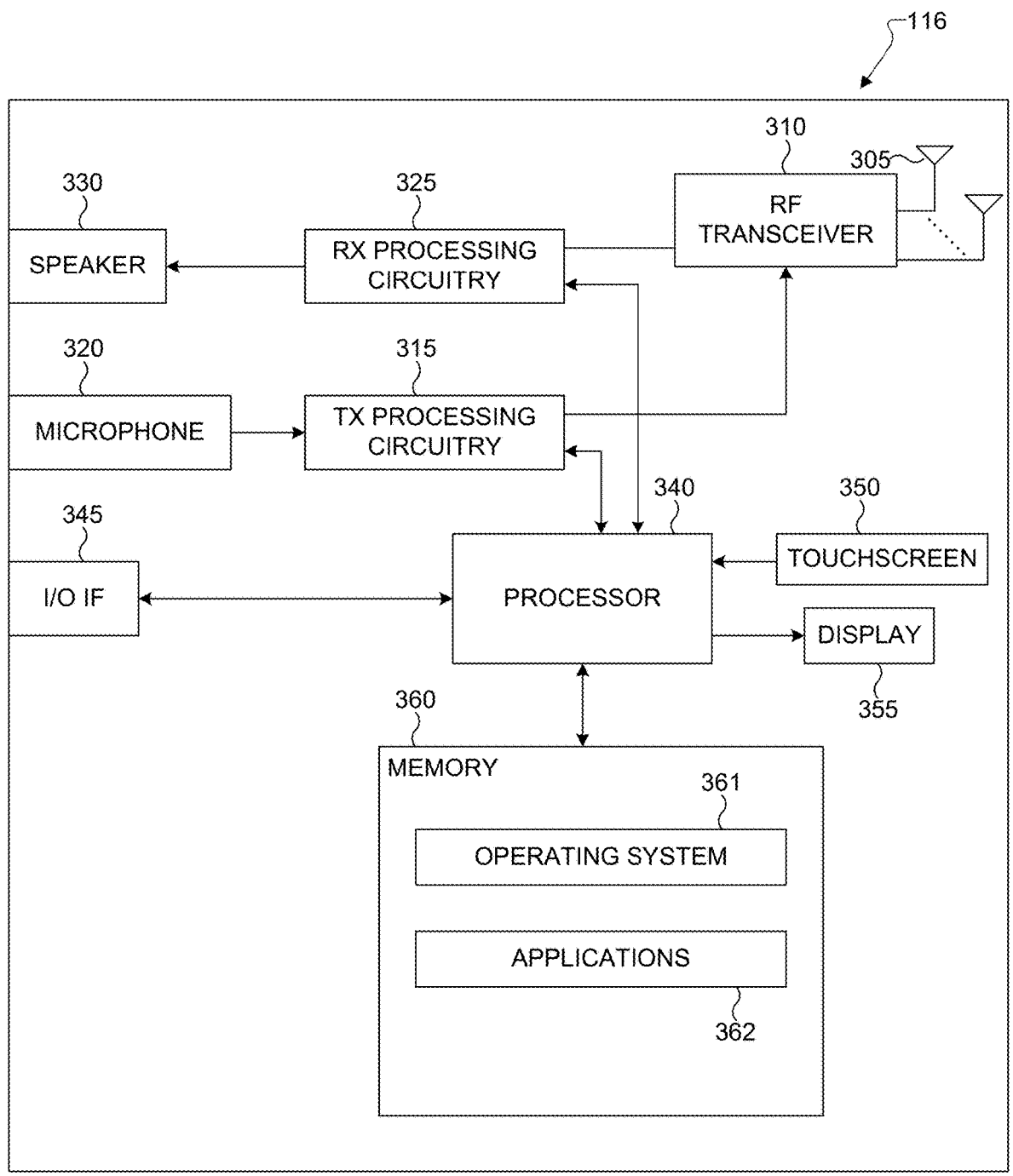
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for reception reliability for data and control information in an advanced wireless communication system. In certain embodiments, and one or more of the gNBs 101-103 includes circuitry, programming, or a combination thereof, for efficient neighbor discovery and wireless inter-connection for cellular mesh network.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of the gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of the UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to reducing power consumption for a user equipment (UE) communicating with a base station and to transmissions to and receptions from a UE of physical downlink control channels (PDCCHs) for operation with dual connectivity. A communication system includes a downlink (DL) that refers to transmissions from a base station or one or more transmission points to UEs and an uplink (UL) that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of subcarriers (SCs). For example, a slot can include 14 symbols, have duration of 1 millisecond or 0.5 milliseconds, and an RB can have a BW of 180 kHz or 360 kHz and include 12 SCs with inter-SC spacing of 15 kHz or 30 kHz, respectively.

DL signals include data signals conveying information content, control signals conveying DL control information (DCI) formats, and reference signals (RS) that are also known as pilot signals. A gNB can transmit data information (e.g., transport blocks) or DCI formats through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

UL signals also include data signals conveying information content, control signals conveying UL control information (UCI), and RS. A UE transmits data information (e.g., transport blocks) or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TBs) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

DL transmissions and UL transmissions can be based on an orthogonal frequency division multiplexing (OFDM) waveform including a variant using DFT precoding that is known as DFT-spread-OFDM.

Figure 4:
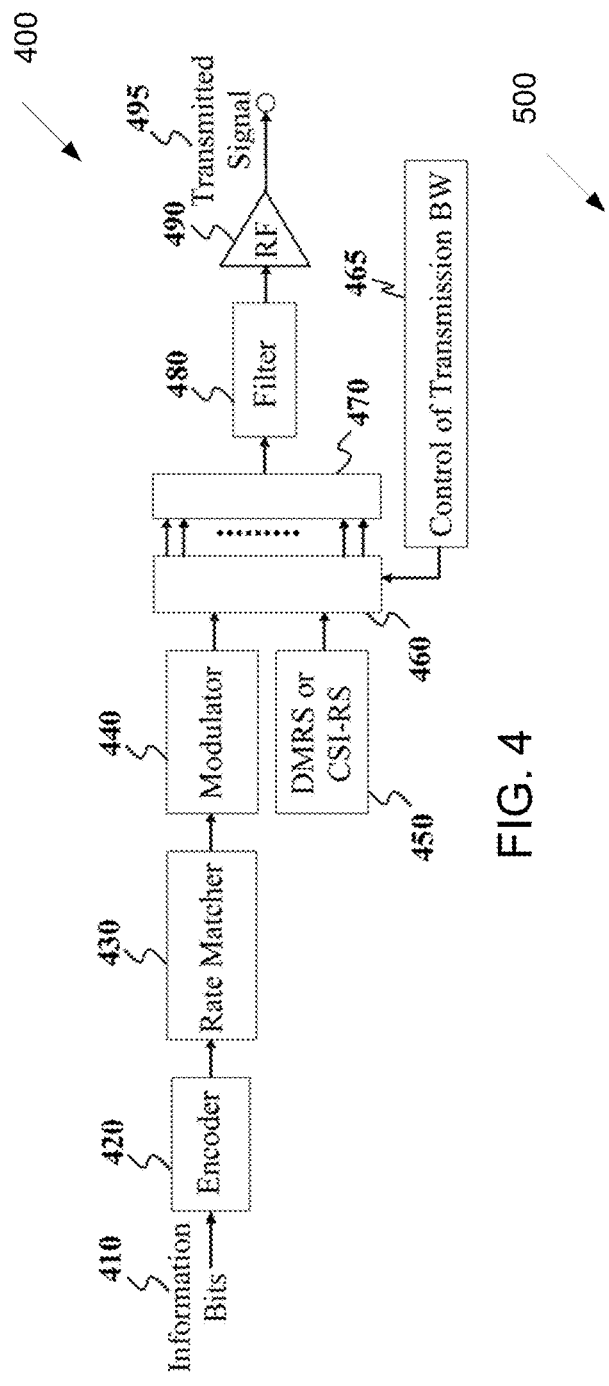
FIG. 4 illustrates an example transmitter structure using OFDM according to embodiments of the present disclosure.

FIG. 4 illustrates an example transmitter structure 400 using OFDM according to embodiments of the present disclosure. An embodiment of the transmitter structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 410, are encoded by encoder 420, rate matched to assigned time/frequency resources by rate matcher 430 and modulated by modulator 440. Subsequently, modulated encoded symbols and DMRS or CSI-RS 450 are mapped to SCs 460 by SC mapping circuit 465, an inverse fast Fourier transform (IFFT) is performed by filter 470, a cyclic prefix (CP) is added by CP insertion circuit 480, and a resulting signal is filtered by filter 490 and transmitted by an radio frequency (RF) circuit 495.

Figure 5:
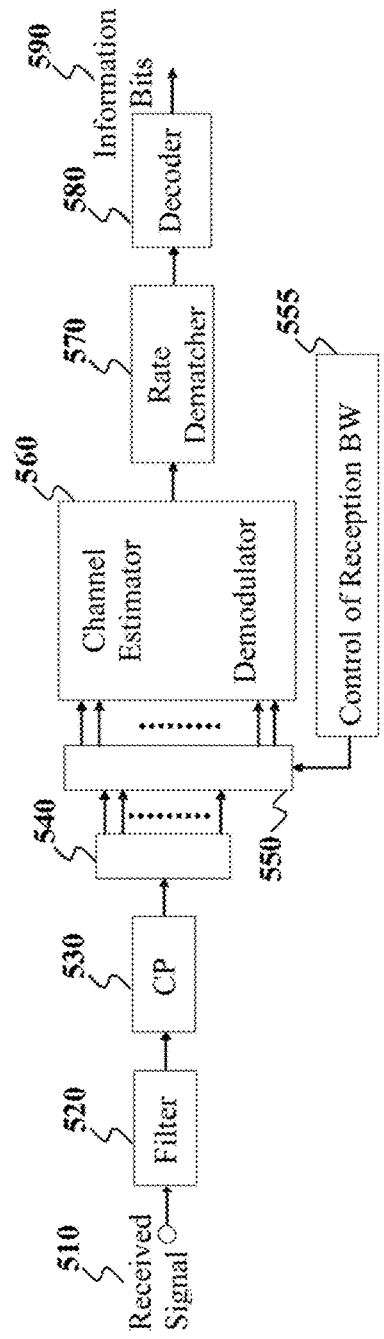
FIG. 5 illustrates an example receiver structure using OFDM according to embodiments of the present disclosure.

FIG. 5 illustrates an example receiver structure 500 using OFDM according to embodiments of the present disclosure. An embodiment of the receiver structure 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

A received signal 510 is filtered by filter 520, a CP removal circuit removes a CP 530, a filter 540 applies a fast Fourier transform (FFT), SCs de-mapping circuit 550 de-maps SCs selected by BW selector circuit 555, received symbols are demodulated by a channel estimator and a demodulator circuit 560, a rate de-matcher 570 restores a rate matching, and a decoder 580 decodes the resulting bits to provide information bits 590.

A UE typically monitors multiple candidate locations for respective potential PDCCH transmissions to decode multiple candidate DCI formats in a slot. Monitoring a PDCCH candidates means receiving and decoding the PDCCH candidate according to DCI formats the UE is configured to receive. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random-access response (RAR), the RNTI can be an RA-RNTI. For a DCI format scheduling a PDSCH or a PUSCH to a single UE prior to a UE establishing a radio resource control (RRC) connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. Each RNTI type can be configured to a UE through higher-layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of physical RBs (PRBs). A gNB can configure a UE one or more sets of PRBs, also referred to as control resource sets, for PDCCH receptions. A PDCCH transmission can be in control channel elements (CCEs) that are included in a control resource set. A UE determines CCEs for a PDCCH reception based on a search space such as a UE-specific search space (USS) for PDCCH candidates with DCI format having CRC scrambled by a RNTI, such as a C-RNTI, that is configured to the UE by UE-specific RRC signaling for scheduling PDSCH reception or PUSCH transmission, and a common search space (CSS) for PDCCH candidates with DCI formats having CRC scrambled by other RNTIs. A set of CCEs that can be used for PDCCH transmission to a UE define a PDCCH candidate location. A property of a control resource set is transmission configuration indication (TCI) state that provides quasi co-location information of the DMRS antenna port for PDCCH reception.

Figure 6:
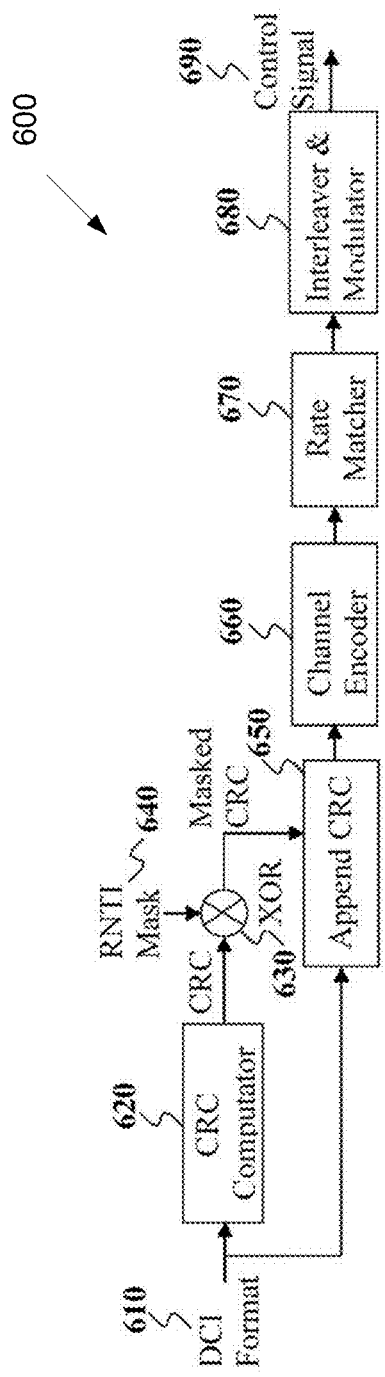
FIG. 6 illustrates an example encoding process for a DCI format according to embodiments of the present disclosure.

FIG. 6 illustrates an example encoding process 600 for a DCI format according to embodiments of the present disclosure. An embodiment of the encoding process 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A gNB separately encodes and transmits each DCI format in a respective PDCCH. A RNTI masks a CRC of the DCI format codeword in order to enable the UE to identify the DCI format. For example, the CRC and the RNTI can include, for example, 16 bits or 24 bits. The CRC of (non-coded) DCI format bits 610 is determined using a CRC computation circuit 620, and the CRC is masked using an exclusive OR (XOR) operation circuit 630 between CRC bits and RNTI bits 640. The XOR operation is defined as XOR (0,0)=0, XOR (0,1)=1, XOR (1,0)=1, XOR (1,1)=0. The masked CRC bits are appended to DCI format information bits using a CRC append circuit 650. An encoder 660 performs channel coding (such as tail-biting convolutional coding or polar coding), followed by rate matching to allocated resources by rate matcher 670. Interleaving and modulation circuits 680 apply interleaving and modulation, such as QPSK, and the output control signal 690 is transmitted.

Figure 7:
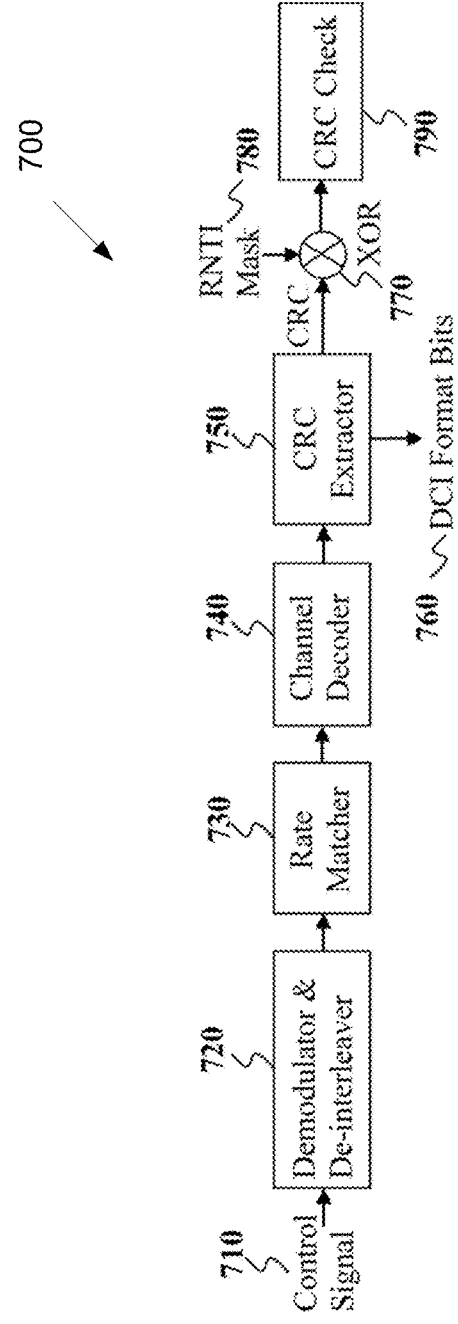
FIG. 7 illustrates an example decoding process for a DCI format for use with a UE according to embodiments of the present disclosure.

FIG. 7 illustrates an example decoding process 700 for a DCI format for use with a UE according to embodiments of the present disclosure. An embodiment of the decoding process 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

A received control signal 710 is demodulated and de-interleaved by a demodulator and a de-interleaver 720. A rate matching applied at a gNB transmitter is restored by rate matcher 730, and resulting bits are decoded by decoder 740. After decoding, a CRC extractor 750 extracts CRC bits and provides DCI format information bits 760. The DCI format information bits are de-masked 770 by an XOR operation with an RNTI 780 (when applicable) and a CRC check is performed by circuit 790. When the CRC check succeeds (check-sum is zero), the DCI format information bits are considered to be valid. When the CRC check does not succeed, the DCI format information bits are considered to be invalid.

Increasing the deployment density of BSs is a way to increase data throughputs, via spatial reuse of frequencies. In fact, such spatial reuse has been one of the main contributors for increase in system throughput since the early days of cellular communication. While improving spatial reuse, a dense BS deployment may be inevitable at millimeter wave (mm-wave) and terahertz (THz) frequencies to improve coverage, by compensating for the pathloss and blockage.

However, the deployment locations and density of conventional BSs is limited by the availability of expensive fiber backhaul.

Figure 8:
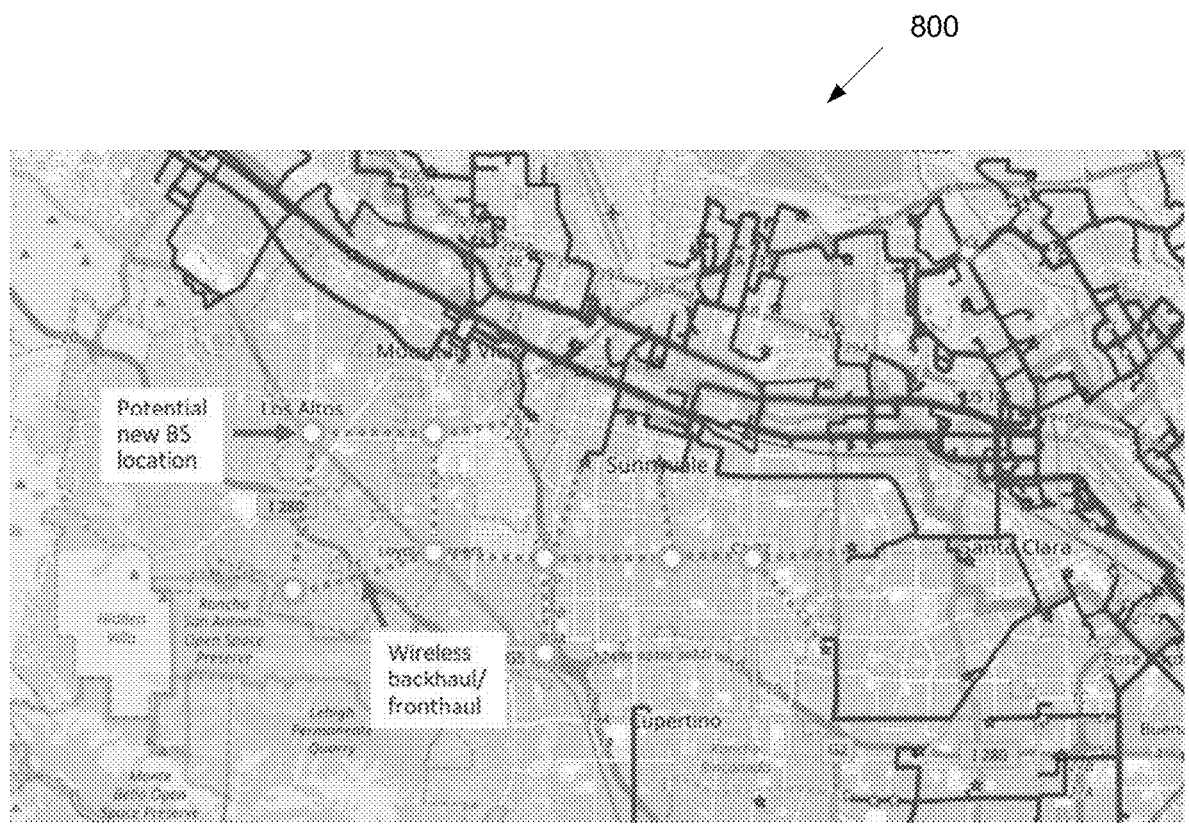
FIG. 8 illustrates an example fiber and BS deployment in which embodiments of the present disclosure may be implemented.

FIG. 8 illustrates an example fiber and BS deployment 800 according to embodiments of the present disclosure. The embodiment of the fiber and BS deployment 800 illustrated in FIG. 8 is for illustration only. FIG. 8 does not limit the scope of the present disclosure to any particular implementation.

As an illustration, FIG. 8 shows a typical fiber and BS deployment in an urban area. An effective way to "unleash" the BS deployment from fiber and provide improved coverage and better deployment density without additional expensive fiber deployment, is by using wireless backhaul for the BSs. To be most effective, such BSs may be capable of establishing one or more backhaul paths to the fiber network, with each path encompassing one or more wireless links as illustrated in FIG. 8 i.e., multi-connectivity and multi-hop functionality can be supported. A deployed network with such capabilities is referred to as a wireless mesh network.

Figure 9:
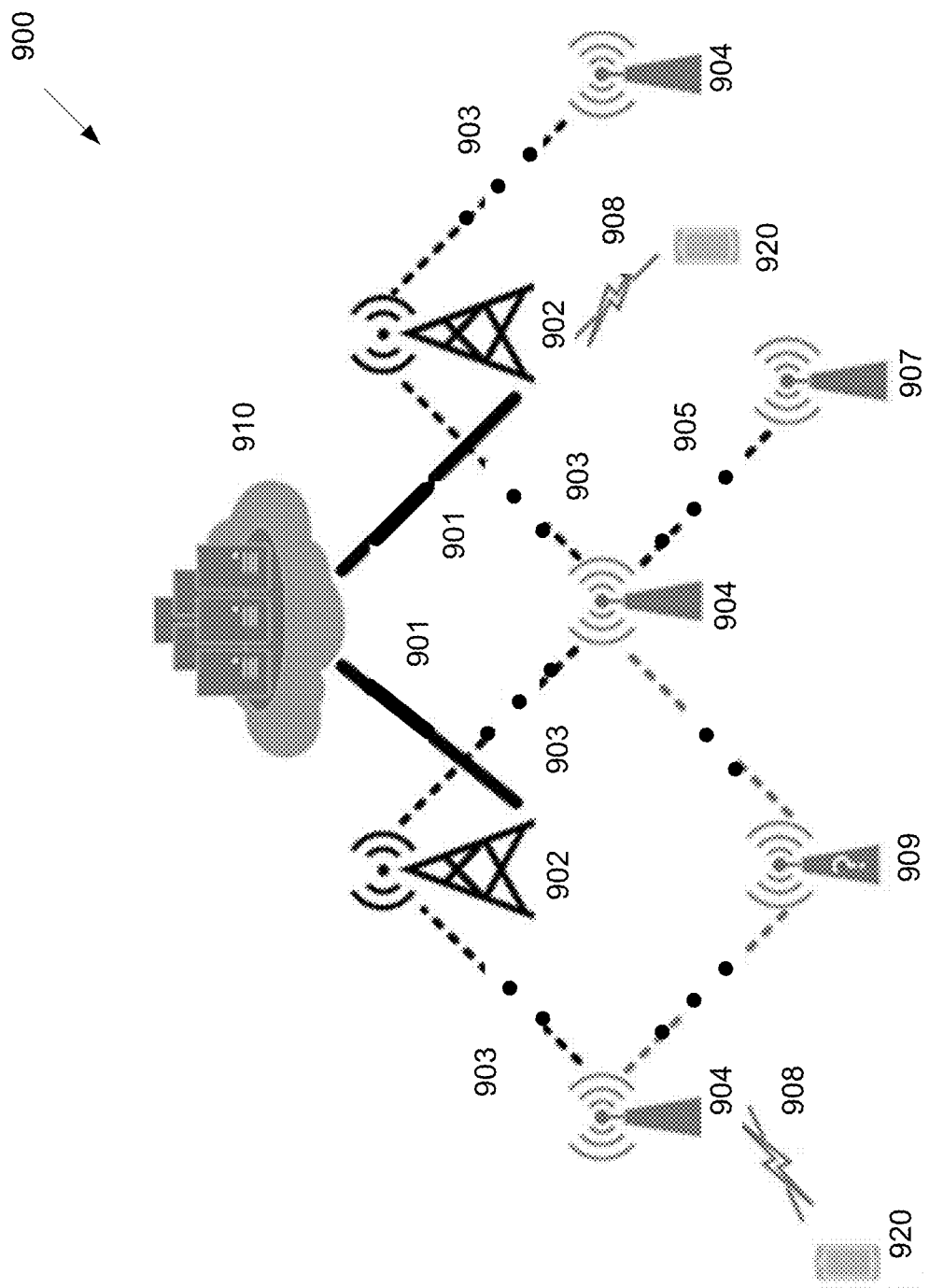
FIG. 9 illustrates an example multi-hop wireless backhaul mesh network according to embodiments of the present disclosure.

FIG. 9 illustrates an example multi-hop wireless backhaul mesh network 900 according to embodiments of the present disclosure. For example, the network 900 is an example of one embodiment of the network 100 in FIG. 1. The embodiment of the multi-hop wireless backhaul mesh network 900 illustrated in FIG. 9 is for illustration only. FIG. 9 does not limit the scope of the present disclosure to any particular implementation.

An illustrative example of a multi-hop wireless mesh network is provided in FIG. 9. Referring to FIG. 9, gateway BSs 902 may be connected to the core network 910 by a fiber/wired backhaul link 901. Similarly, mesh BSs 904 may be connected to one or more of the gateway BSs 902 via wireless connection 903, and a mesh BS 907 may be wirelessly connected to one or more of the mesh BSs 904 via wireless interface 905. A UE 920 can be connected either to a mesh BS or to a gateway BS via a wireless access link 908. The DL backhaul traffic to mesh BS 904 can be routed from the core network 910 to gateway BS 902 through fiber/wired backhaul interfaces 901 and then transmitted to the BS 904 through the wireless interface 903.

The uplink backhaul traffic from the mesh BS 904 may be transmitted through the wireless interface 903 to the gateway BS 902 and then routed to the core network 910 by the fiber/wired backhaul interface 901. Similarly the downlink backhaul traffic to the mesh BS 907 may be routed from the core network 910 to the gateway BS 902 via the wired interface 901, and then transmitted via the wireless interface 903 to the mesh BS 904 and then via wireless interface 905 to the mesh BS 907. The immediate previous hop BS that provides a mesh BS/UE connectivity to the core network is referred to as a parent BS.

The mesh BSs 904, 907 with already existing single hop 903 or the multi-hop 903-905 backhaul interface to the gateway BS 902 or the core network 910 is referred to as a connected mesh BS. Similarly, the mesh BS 909 that currently does not have a backhaul interface to the core network 910 is referred to as a new mesh BS. For an in-band operation, the BS-BS backhaul interfaces 903, 905, may re-use the same frequency resource as the BS-UE access links 908, while for out-of-band operation, both backhaul/fronthaul and access link may use different frequency resources. For centralized control case, the fronthaul/backhaul traffic routing decisions for the mesh network may be made by the gateway BS or another entity within the core network. For the decentralized control, each BS may make the fronthaul/backhaul traffic routing decisions by itself.

Figure 10:
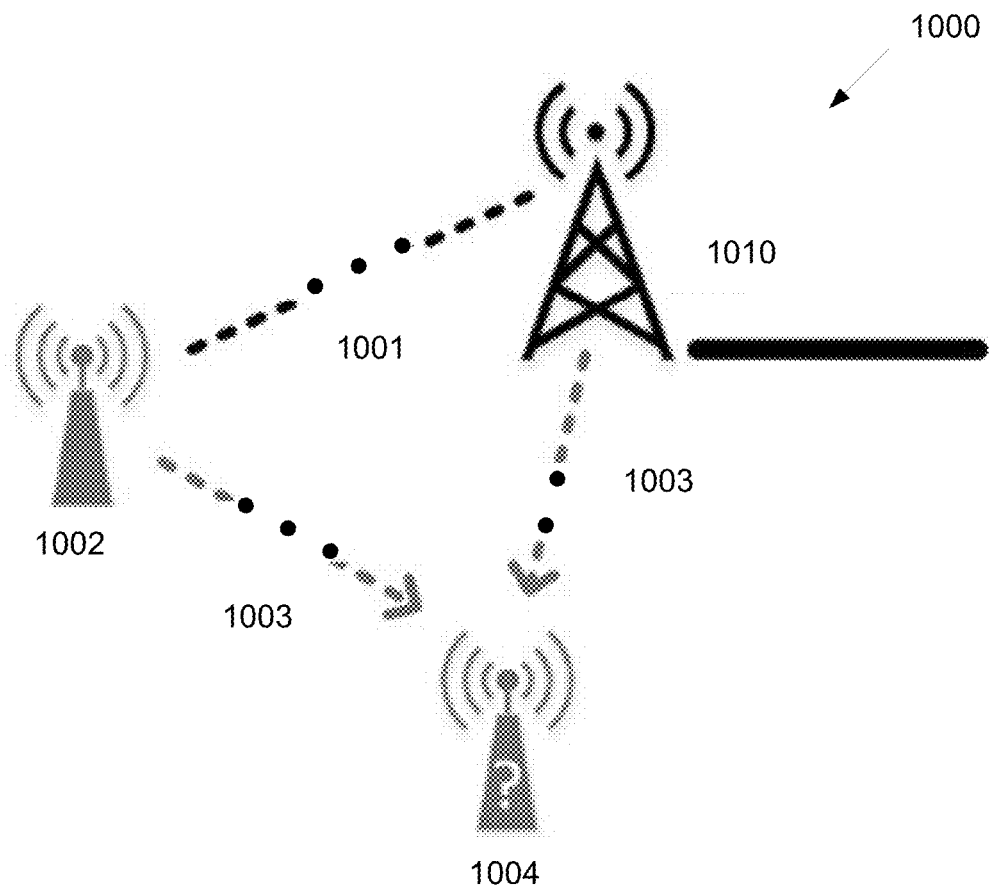
FIG. 10 illustrates an example of new mesh BS discovery in a network according to embodiments of the present disclosure.

FIG. 10 illustrates an example of new mesh BS discovery in a network 1000 according to embodiments of the present disclosure. For example, the network 1000 may be implemented in the network 900 in FIG. 9. The embodiment of the new mesh BS discovery illustrated in FIG. 10 is for illustration only. FIG. 10 does not limit the scope of the present disclosure to any particular implementation.

Due to mobility of the mesh BSs, BS sleep modes, and/or varying channel conditions, a procedure may be required to enable discovery and connectivity of a new mesh BS to the core network. Such an example is illustrated in FIG. 10 for a new mesh BS 1004. The process may encompass synchronizing new mesh BS 1004 to one or more of gateway BSs 1010 or connected BSs 1002, performing channel measurement and beam alignment for establishing corresponding wireless interfaces 1003 and establishing a routing mechanism to direct backhaul traffic to/from the core network from/to the new mesh BS. The present disclosure provides embodiments on procedures for enabling such new mesh BS connectivity, through the transmission of a signal block referred to as the neighbor discovery signal block (NDSB).

Figure 11:
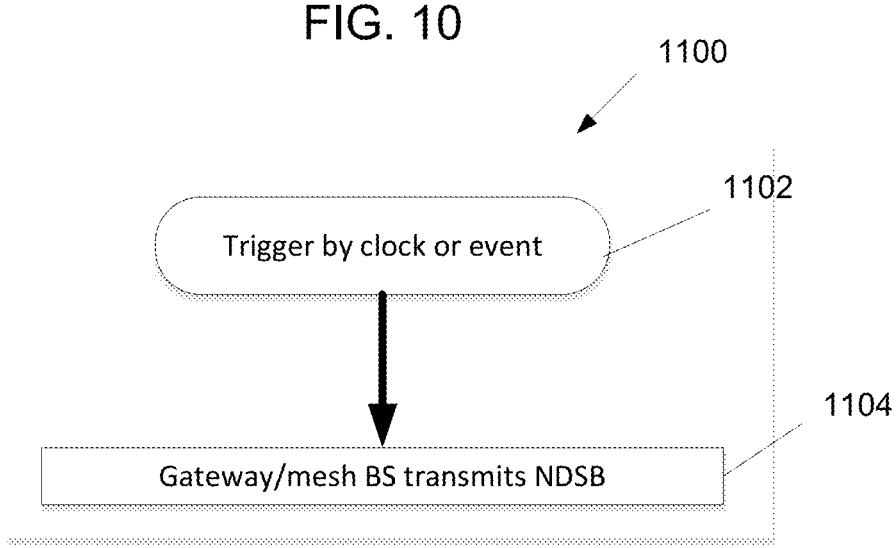
FIG. 11 illustrates a flowchart of a method for NDSB transmission by gateway/connected mesh BS according to embodiments of the present disclosure.

FIG. 11 illustrates a flowchart of a method 1100 for NDSB transmission by a gateway/connected mesh BS according to embodiments of the present disclosure. For example, the method 1100 may be performed by a gateway/connected mesh BS such as any one of those discussed above with regard to FIGS. 1 and/or 9. The embodiment of the NDSB transmission illustrated in FIG. 11 is for illustration only. FIG. 11 does not limit the scope of the present disclosure to any particular implementation.

As illustrated in FIG. 11, to transmit NDSB, in step 1102, a transmission is triggered by a clock or an event. Next, in step 1104, the gateway/mesh BS transmits the NDSB. In one embodiment, an NDSB may be transmitted by the gateway BSs and the connected mesh BSs periodically, as illustrated in the flow diagram in FIG. 11. In another embodiment, the NDSB is only transmitted by the gateway BSs periodically and not by the connected mesh BSs. In yet another embodiment the NDSBs may be transmitted aperiodically, after being triggered by the core network or a network/channel condition. In yet another embodiment, the NDSBs may be transmitted in response to a reception of request message from a connected or new mesh nodes.

As illustrated in FIG. 11, a reception of NDSB request message can be one of such event. In one embodiment, the NDSB may be transmitted by all the BS simultaneously, while in another embodiment the NDSB may be transmitted by one BS at a time, in a staggered, non-overlapping way. In another embodiment, the NDSB transmission by the BSs may be uncoordinated. In one embodiment, the NDSB can be jointly used for discovery and synchronization of the access links to UEs and the backhaul/fronthaul links to mesh BSs. In another embodiment, the NDSB may be reserved only for new mesh BS fronthaul/backhaul links.

In one embodiment, a new mesh BS upon initialization may perform a search for a gateway or a connected mesh BS to gain access to the core network. In one embodiment, such initialization may be triggered by a wakeup procedure at the new mesh BS, while in another embodiment, the initialization may be triggered by, for example, BS mobility or breaking of a previous wireless backhaul/fronthaul link to a gateway/connected mesh BS.

In one embodiment, a new mesh BS may search for an NDSB omni-directionally, while in another embodiment, a new mesh BS may perform sequential beam scanning. Upon detection of one or more NDSBs, a new mesh BS may utilize the information within the NDSB to determine the BS to connect to. Subsequently a new mesh BS may perform a random access towards the selected BS.

In one embodiment, the random-access resource is common for mesh BSs and UEs. In another embodiment, the mesh BSs may have a separate random-access procedure from the UEs. For an example, the link between the mesh BSs may be configured with different time or frequency or code resources for the transmission of random-access preambles, compared to the access link for the UEs. In doing so, the random-access resource pool can even be differently defined between the links for the UEs and the links for the mesh BSs. In one another embodiment, the steps of the random-access procedures can be different between the UE access link and the mesh link, e.g., a 2-step random access procedure for the mesh link and a 4-step random access procedure for the UE access link.

Figure 12A:
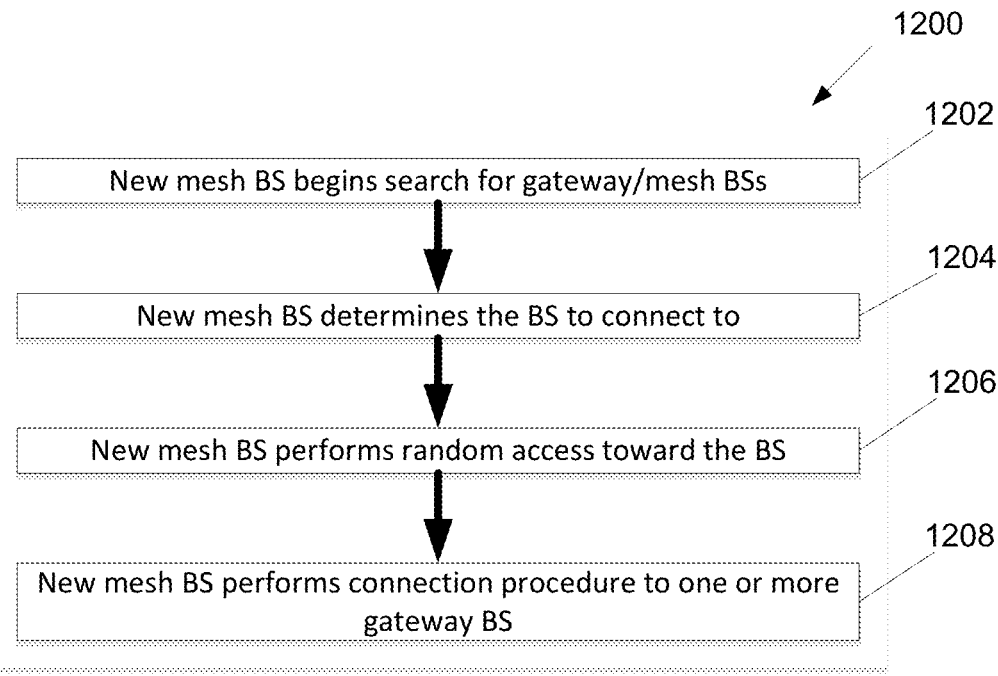
FIG. 12A illustrates a flowchart of a method for network entry of new mesh BS according to embodiments of the present disclosure.

FIG. 12A illustrates a flowchart of a method 1200 for network entry of new mesh BS according to embodiments of the present disclosure. For example, the method 1200 may be performed by a BS such as any one of those discussed above with regard to FIGS. 1 and/or 9. The embodiment of the method 1200 illustrated in FIG. 12A is for illustration only. FIG. 12A does not limit the scope of the present disclosure to any particular implementation.

As illustrated in FIG. 12A, the method 1200 begins at step 1202. In step 1202, a new mesh BS begins search for gateway/mesh BSs. Subsequently, in step 1204, the new mesh BS determines the BS to connect to. Next, in step 1206, the new mesh BS performs random access toward the BS. Finally, in step 1208, the new mesh BS performs connection procedure to one or more gateway BS.

Figure 12B:
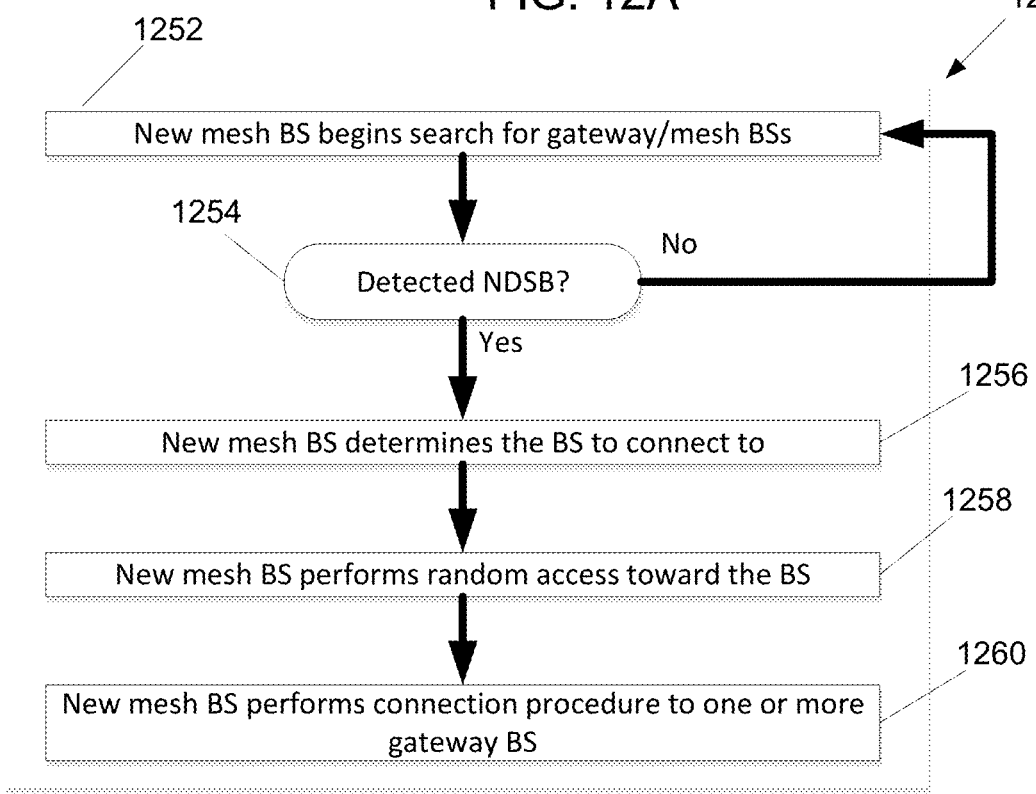
FIG. 12B illustrates flowchart of a method for network entry of new mesh BS according to embodiments of the present disclosure.

FIG. 12B illustrates another flowchart of a method 1250 for network entry of new mesh BS according to embodiments of the present disclosure. For example, the method 1200 may be performed by a BS such as any one of those discussed above with regard to FIGS. 1 and/or 9. The embodiment of the method 1250 illustrated in FIG. 12B is for illustration only. FIG. 12B does not limit the scope of the present disclosure to any particular implementation.

As illustrated in FIG. 12B, the method 1250 begins at step 1252. In step 1252, a new mesh BS begins search for gateway/mesh BSs. Subsequently, in step 1254, the new mesh BS determines whether NDSB is detected. In step 1254, if NDSB is not detected, the method 1250 performs step 1252. In step 1254, if NDSB is detected, the method performs step 1256. In step 1256, the new mesh BS determines the BS to connect to. Subsequently, in step 1258, the new mesh BS performs random access toward the BS. Finally, in step 1260, the new mesh BS performs connection procedure to one or more gateway BS.

A new mesh BS then attempts to establish connection to the core network via the selected BS. The flow diagram of this procedure is illustrated in FIGS. 12A and 12B.

In one embodiment, the NDSB may include one or more of: (i) synchronization signals, such as a primary synchronization sequence (PSS) and a secondary synchronization sequence (SSS); (ii) an always-on reference signal (RS), for example, demodulation reference signal (DMRS) for PBCH; (iii) a channel state information RS (CSI-RS); (iv) a master information block (MIB); and (v) system information block (SIB).

As an example, the MIB may be conveyed in the physical broadcast channel (PBCH) and the SIB may be conveyed in the physical downlink shared channel (PDSCH), which are transmitted in 3GPP LTE/NR systems, or the MIB may be conveyed in any variants for future generations of systems.

The PSS and SSS can help in timing/frequency synchronization, cell ID acquisition etc. to a new mesh BS. The always-on RS can help radio resource management (RRM) measurements including measurement and/or computations of reference signal received power (RSRP), received signal strength indicator (RSSI), and reference signal received quality (RSRQ), etc. at a new mesh BS or a mesh BS in radio resource control (RRC)-idle state.

In another embodiment, the PSS or SSS can be used for RRM measurement. The CSI-RS can be used for channel estimation/CSI acquisition at mesh BSs. Apart from the conventional information which is included in the MIB for 3GPP systems (e.g., NR or LTE), such as system frame number (SFN), an SSB-subcarrier offset, a CORESET/DMRS configuration for SIB scheduling, barring information etc., the suggested NDSB MIB may contain additional information such as: (a) mesh capability information; (b) gateway BS indication; (c) random access resource; (d) routing information; and (e) hardware capability information. In another embodiment, one or more of these IEs (e.g., (a) to (e)) may be included in the NDSB SIB and the corresponding details are provided below.

In one embodiment, the PSS/SSS/DMRS sequences for NDSB could reuse the corresponding sequences for LTE/NR. In order to distinguish between the legacy LTE/NR BS and mesh BS, the NDSB may be transmitted in different time/frequency/code resources. In another embodiment, new sequences (e.g., M sequence or Zadoff-Chu sequence) which are orthogonal or semi-orthogonal to the sequence in LTE/NR may be designed for NDSB.

The mesh capability indication field may include information regarding whether the transmitting BS supports mesh functionality. This field, for example, may help provide backward compatibility to legacy BSs which are not capable of supporting mesh functionality. Even a BS that supports mesh functionality can opt out from operating as a mesh BS depending on various operating conditions, e.g., traffic load or computational overhead or power or cost issues.

The gateway BS indication field may provide information regarding whether the transmitting BS is a gateway BS. With this IE, a new mesh BS can, for example, give priority in selecting a parent BS to connect with in the procedures provided in FIGS. 12A and 12B.

The random access resource field may include information regarding the time/frequency resource configuration of the mesh BS preamble transmission and also may include an exclusive sequence set dedicated for the mesh BSs for the case when UEs and mesh BSs share the random access resources. For co-channel cases, the random access channel (RACH) resource can be separately configured between the BS-UE access link and the BS-BS mesh backhaul link. Alternatively the same RACH resource can be configured for BS-UE and BS-BS links, but with or without a separate sequence set configuration. This field may also include information on when the same beam can be used by the mesh BS again for an incoming random access.

The routing information field may provide important metrics for establishing a route between the new mesh BS and the core network. The routing information may include parameters for the route between the transmitting BS and one or more gateway BSs, such as: hop count to the nearest K gateway BSs (K≥1); immediate neighboring BSs to the transmitting BS; corresponding Tx/Rx beam(s) between neighboring BSs and transmitting BS; expected transmission numbers (ETX) to reach a gateway BS (e.g., ETX can be defined as the required number of transmissions along the end-to-end path to deliver a packet of a certain size at a certain loss rate; expected transmission time (ETT) to reach a gateway BS (e.g., ETT can be defined as the time required to transmit a packet of a certain size along the end-to-end path considering capacity of each hop); actual link capacity of route to a gateway BS (e.g., actual link capacity can be the amount of capacity that can be allocated to new mesh BSs out of the total achievable capacity); expected latency of the link to a gateway BS; and link reliability information, including probability of blockage, link downtime statistics, and channel coherence time.

Some of the aforementioned IEs can be quantized, for example, X-bit information is used to quantize the reliability information where X can be 1, 2, 3, 4 . . . .

Hardware capability information field may include information regarding the hardware capabilities of the mesh BS, such as support for multi-band transmission, for e.g., support of sub 6 GHz frequencies for a mesh network operating at mm-wave/THz frequencies or vice-versa (e.g., standalone, non-standalone mode of operation), transmission power of the BS, BS antenna height, number of spatial streams supported/available, or remaining battery life for the transmitting BS for the case of a battery operated mesh BSs.

In one embodiment, some of the above listed information can be indicated via quantized class value, e.g., transmission power classes. In another embodiment, some of the hardware capabilities can be compressed and jointly expressed in to a set of BS classes, e.g., {class1, class2 etc.}, and the class index is reported in this field. Such hardware capability information can help a new mesh BS in selecting a preferred parent BS. As an example, but not a limitation, a parent BS with sub 6 GHz multi-band support and/or a large BS height may be given preference by a high mobility mesh BS in a mm-wave mesh network.

In another embodiment, network synchronization state is included in this field. For example, 1-bit information is transmitted whether the whole mesh network is timely synchronized or timely unsynchronized through global navigation satellite system (GNSS) or other synchronization methods.

Due to mobility of the mesh BSs, BS sleep modes, and/or varying channel conditions, a procedure may be required to enable discovery and connectivity of a new mesh BS to the core network. This can be enabled by a new mesh BS discovery procedure, as detailed below.

Such an example is illustrated in FIG. 10 for a new mesh BS 1004. In one embodiment, this is achieved by transmitting a new BS discovery signal block (NDSB) by the gateway BSs 1010 and/or the connected BSs 1002 (e.g., mesh BSs). The new mesh BS 1004 may use the NDSB to synchronize to a gateway BS 1010 or a connected mesh BS 1002, to perform channel measurement and beam alignment for establishing the corresponding wireless interfaces 1003, and for determining a suitable route to direct backhaul traffic to/from the core network from/to the new mesh BS.

Note that since a new mesh BS can receive NDSB from multiple gateway BSs and/or mesh BSs, and correspondingly can have multiple candidate paths to the core network, a procedure may be required for selecting one or more parent BS and the corresponding path to route traffic. The present disclosure provides embodiments on procedures for determining a parent BS and for routing the backhaul traffic to/from the core network. In one embodiment, referred to as the centralized approach, these decisions are made by a gateway BS or by another entity in the core network. In another embodiment, referred to as the decentralized approach, these decisions are made by each mesh BS itself.

In one embodiment, an NDSB is transmitted by the gateway BS and connected mesh BS periodically, as illustrated in the flow diagram in FIG. 11. In another embodiment, the NDSB is only transmitted by the gateway BS periodically. In yet another embodiment, the NDSB is transmitted aperiodically, after being triggered by the core network or a network/channel condition. In yet another embodiment, the NDSBs may be transmitted in response to a reception of request message from a connected or new mesh nodes.

As illustrated in FIG. 11, a reception of NDSB request message can be one of such event. In one embodiment, the NDSB is transmitted by all the BSs simultaneously, while in another embodiment, the NDSB is transmitted by the BSs in a staggered, non-overlapping way. In another embodiment the NDSB transmission by the BSs is uncoordinated. In one embodiment, the NDSB can be jointly used for discovery and synchronization of the access links to UEs and the backhaul/fronthaul links to mesh BSs.

In another embodiment, the NDSB may be reserved only for new mesh BS backhaul/fronthaul links. In one embodiment, the NDSB may include one or more of: (i) synchronization signals; such as a primary synchronization sequence (PSS) and a secondary synchronization sequence (SSS); (ii) an always-on reference signal (RS); (iii) a channel state information RS (CSI-RS), (iv) a Master information block (MIB) and (v) System information block (SIB).

The PSS and SSS can help timing/frequency synchronization, cell ID information acquisition, etc. to a prospective new mesh BS. The always-on RS can help radio resource management (RRM) measurements including measurement and/or computations of reference signal received power (RSRP), received signal strength indicator (RSSI), and reference signal received quality (RSRQ), etc at a new mesh BS or a mesh BS in radio resource control (RRC)-idle state.

In another embodiment, PSS or SSS can be used for such RRM measurement. The CSI-RS can be used for channel estimation/CSI acquisition at a connected mesh BS. Apart from the conventional information within MIB for 3GPP systems (e.g., NR or LTE), such as system frame number (SFN), SSB-subcarrier offset, CORESET/DMRS configuration for SIB scheduling, barring information etc., the suggested NDSB MIB may contain additional information such as: (a) mesh capability information; (b) gateway BS indication; (c) random access resource; (d) routing information; and (e) hardware capability information. In another embodiment, part of the aforementioned information (e.g., (a) to (e)) is included in the NDSB SIB.

Figure 13:
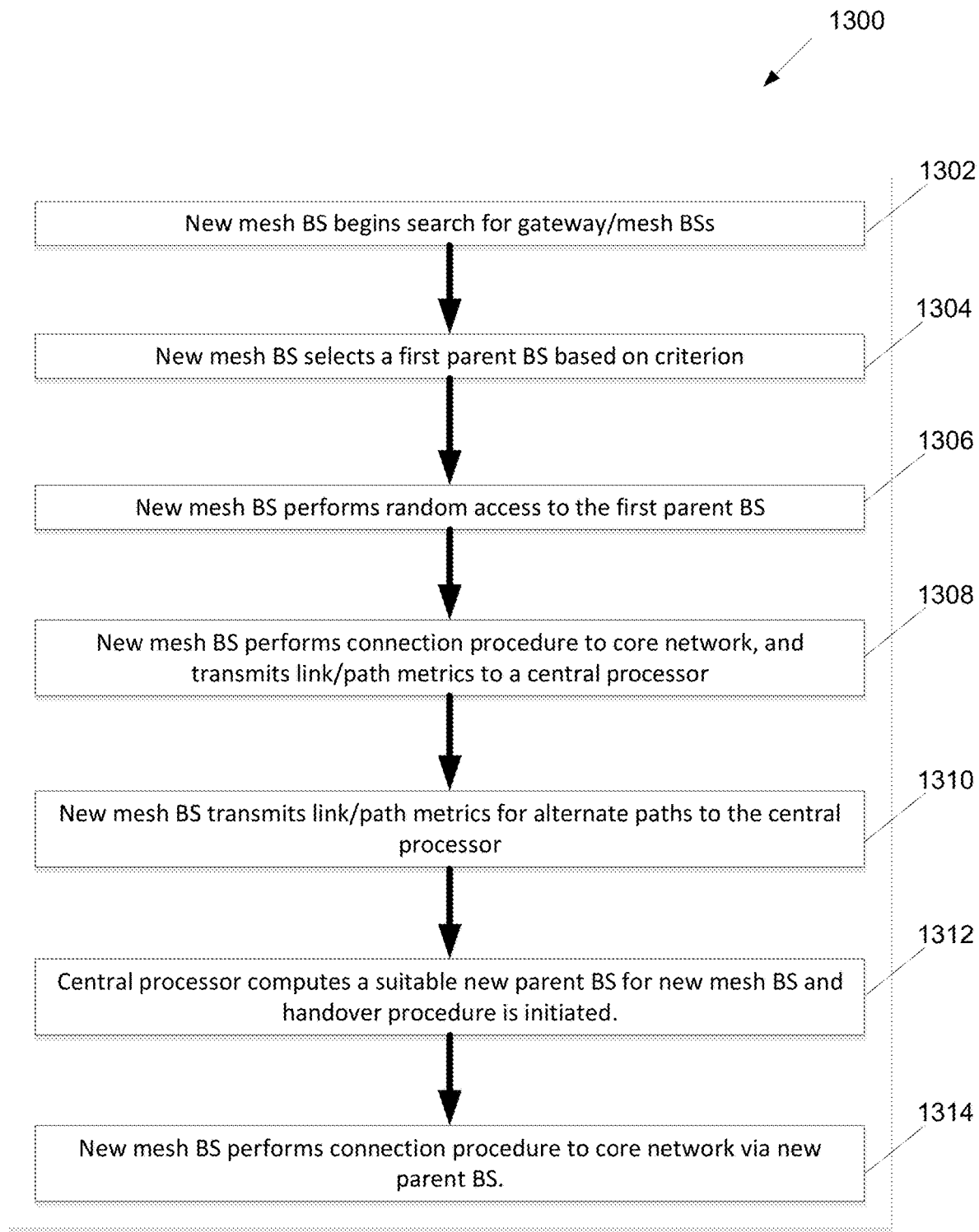
FIG. 13 illustrates a flowchart of a method for parent BS selection according to embodiments of the present disclosure.

FIG. 13 illustrates a flowchart of a method 1300 for parent BS selection according to embodiments of the present disclosure. For example, the method 1300 may be performed by a BS such as any one of those discussed above with regard to FIGS. 1 and/or 9. The embodiment of the method 1300 illustrated in FIG. 13 is for illustration only. FIG. 13 does not limit the scope of the present disclosure to any particular implementation.

As illustrated in FIG. 13, the method 1300 begins at step 1302. In step 1302, a new mesh BS begins search for gateway/mesh BSs. Subsequently, in step 1304, the new mesh BS selects a first parent BS based on criterion. Subsequently, in step 1306, the new mesh BS performs random access to the first parent BS. Subsequently, in step 1308, the new mesh BS performs connection procedure to core network and transmits link/path metrics to a central processor. Subsequently, in step 1310, the new mesh BS transmits link/path metrics for alternate paths to the central processor. Next, in step 1312, a central processor computes a suitable new parent BS for new mesh BS and handover procedure is initiated. Finally, in step 1314, the new mesh BS performs connection procedure to core network via new parent BS.

Figure 14:
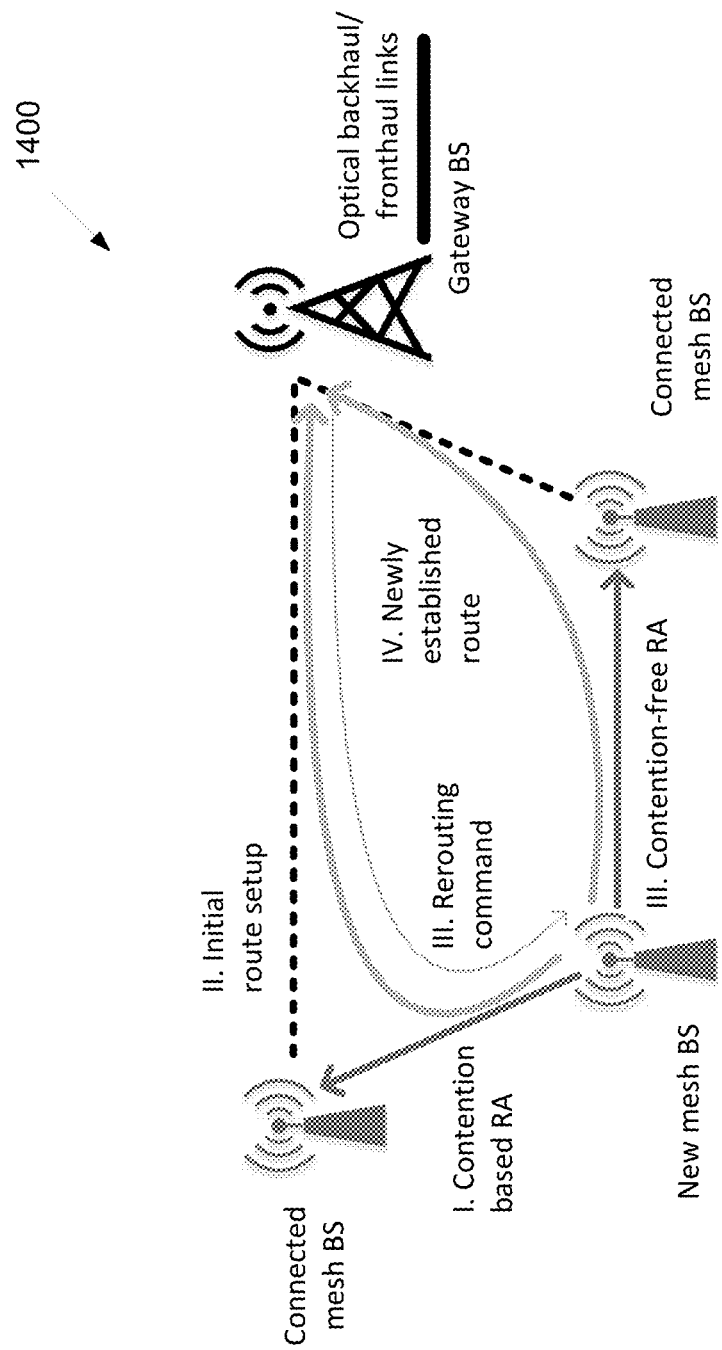
FIG. 14 illustrates an example of parent BS selection in a network according to embodiments of the present disclosure.

FIG. 14 illustrates an example of parent BS selection in a network 1400 according to embodiments of the present disclosure. For example, the network 1400 may be implemented in the network 900 in FIG. 9. The embodiment of the parent BS selection illustrated in FIG. 14 is for illustration only. FIG. 14 does not limit the scope of the present disclosure to any particular implementation.

In one embodiment, the new mesh BS may receive one or multiple NDSBs from one or more BSs. The new mesh BS may then initiate a contention based random access procedure with the source of a successfully detected NDSB. In one embodiment, this NDSB is the first successfully detected NDSB whose source BS has mesh capability. The mesh capability can be learned, for example, using the mesh capability indicator information element (IE) in the information block conveyed in the NDSB. This first parent mesh BS may enable the new mesh BS to get connected to the core network.

Figure 15A:
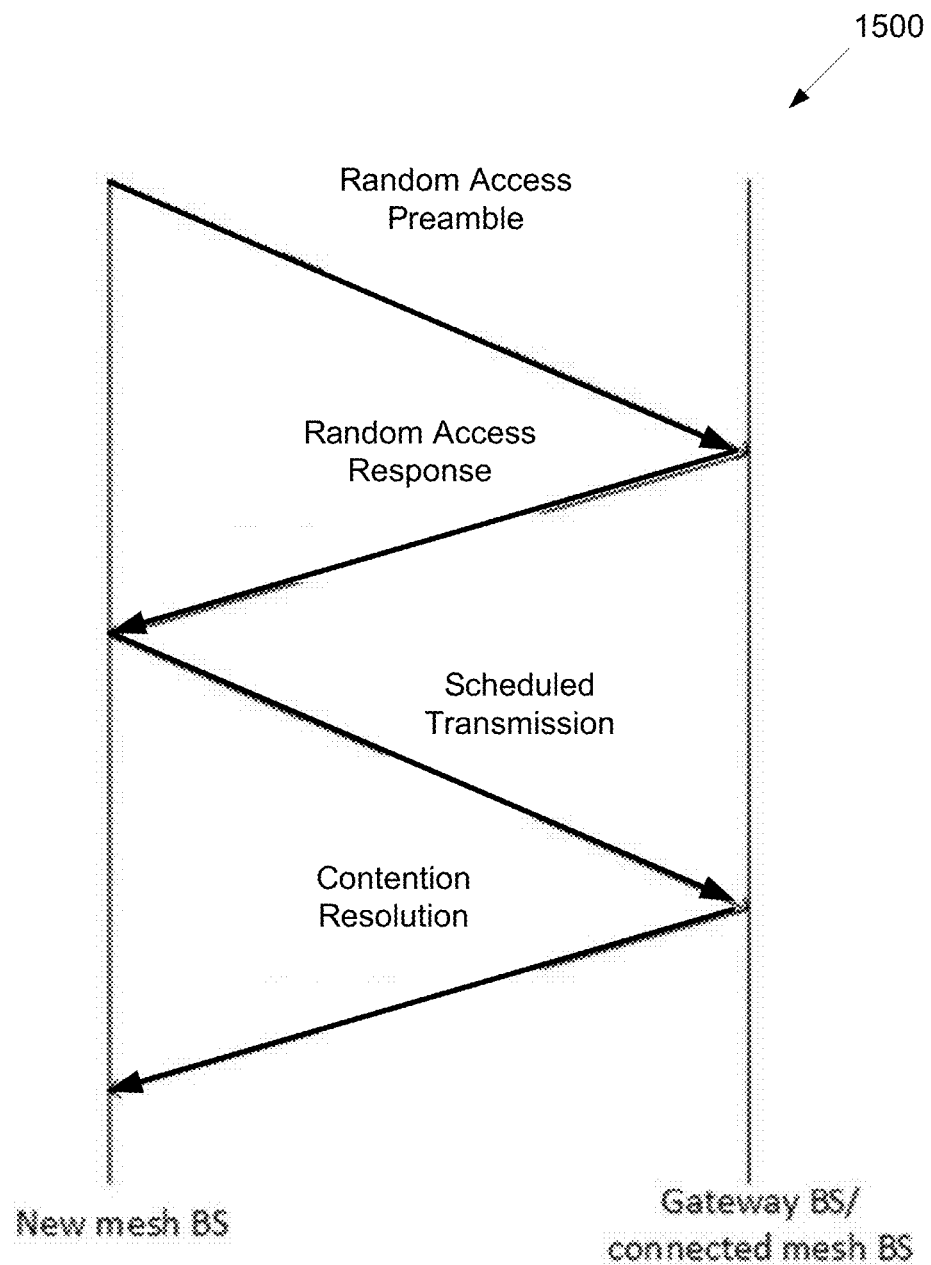
FIG. 15A illustrates an example message flow diagram for 4-step contention based random access according to embodiments of the present disclosure.

In another embodiment, the new mesh BS may accumulate one or more NDSBs, and/or may use the signals received in the NDSBs, e.g., RSs or PSS/SSS, to estimate RRM indicators, e.g., RSRP, RSRQ, RSSI for the multiple NDSBs. The new mesh BS may then initiate a contention based random access procedure with a BS providing, for example, the best signal strength among those indicated positive mesh capability. In one embodiment, the contention based random access procedure can be a 4-step process as illustrated in FIG. 15A.

Figure 15B:
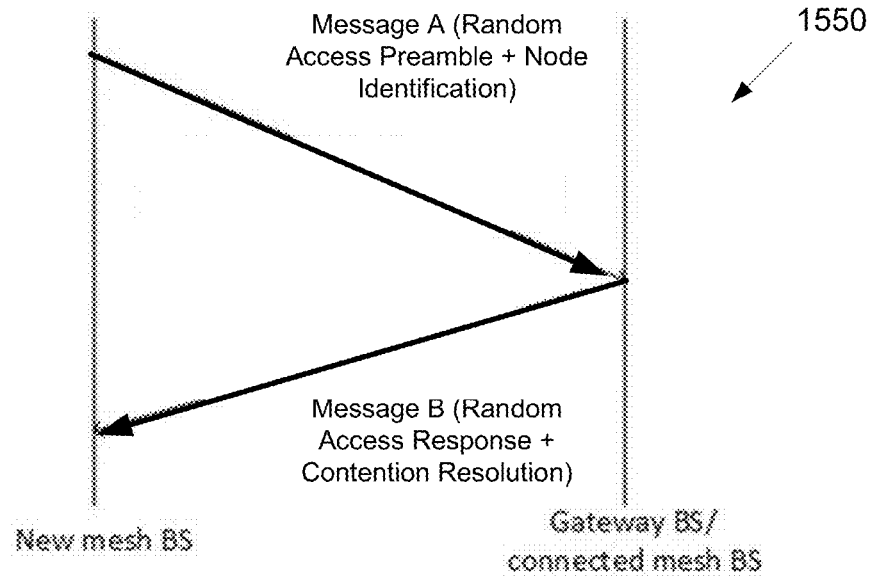
FIG. 15B illustrates an example message flow diagram for 2-step contention based random access according to embodiments of the present disclosure.

In another embodiment, it can be a 2-step process as illustrated in FIG. 15B. After association with the selected BS (parent), link metrics such as RSRP, RSRQ, RSSI, beam angle measurements etc. may be forwarded to the parent, which may further be forwarded to central processor. Here central processor can correspond to or be a part of a gateway BS, existing core network entity, a central unit in a cloud radio access network (C-RAN) architecture or a new central processing entity to collect and process the measurement reports from the mesh BSs. The new central processing entity may logically reside in one of existing network entities such as MME or the new central processing can be a new separated network entity from the existing ones.

In another embodiment, full path cost from gateway BS to the new mesh BS may be forwarded to the central processor. Such cost metrics, for example, can be either computed at a new mesh BS using the information in MIB/SIB.

Figure 15C:
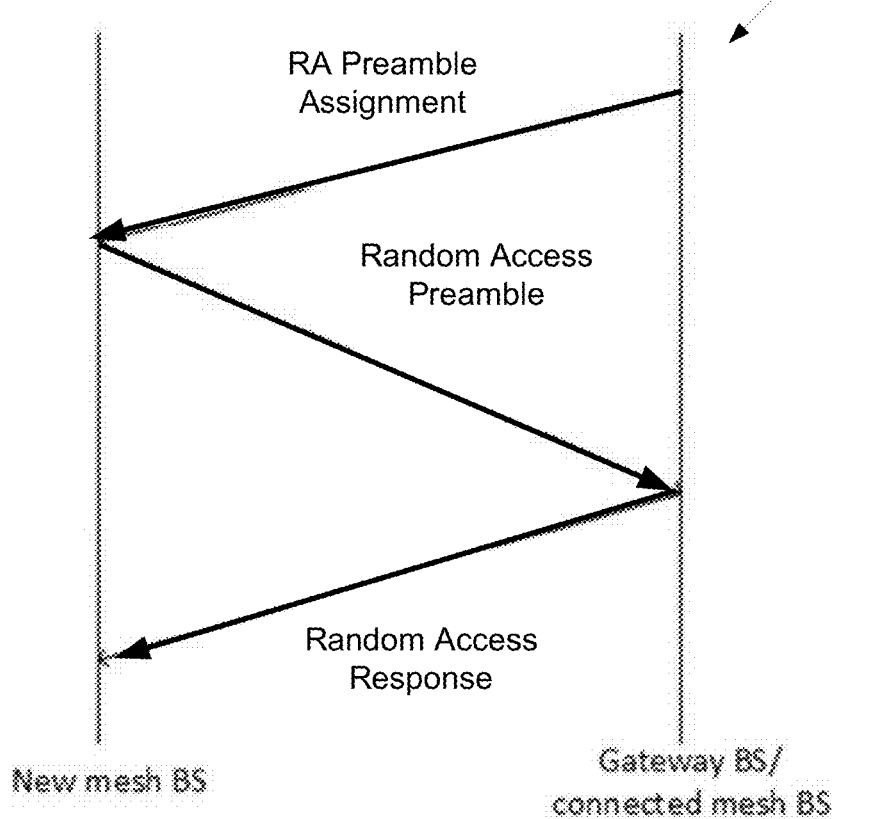
FIG. 15C illustrates an example message flow diagram for contention free random access according to embodiments of the present disclosure.

In one embodiment, the new mesh BS also performs intra/inter-frequency measurements to other connected mesh BSs, and forwards them to the central processor via the current parent BS. In one embodiment, the central processor may use the received link metrics to update a routing table, and identify a suitable updated parent BS and a route to the new mesh BS. The central processor can then initiate a RRC re-establishment procedure through a contention free random access, similar to hand-over procedure as illustrated in FIG. 15C.

In one embodiment of this centralized approach, some of the routing information such as: a gateway BS indication, routing information and hardware capability information may be omitted from the NDSB MIB, unlike in distributed approaches.

In one embodiment, the new mesh BS may receive NDSBs from one or more BSs. The new mesh BS may then initiate a contention based random access procedure with the source of a successfully detected NDSB. In one embodiment, this NDSB is the first successfully detected NDSB whose source BS has mesh capability. The mesh capability can be learned, for example, using the mesh capability indicator IE in the NDSB MIB.

In another embodiment, the new mesh BS may accumulate one or more NDSBs, and/or may use the signals received in the NDSBs, e.g., RSs or PSS/SSS, to estimate RRM indicators, e.g., RSRP, RSRQ, RSSI for many NDSBs. The new mesh BS may then initiate a contention based random access procedure with the BS providing best signal strength among those indicated positive mesh capability.

FIG. 15A illustrates an example message flow diagram 1500 for 4-step contention based random access according to embodiments of the present disclosure. For example, the message flow diagram 1500 may be performed between BSs in a network such as any one of those discussed above with regard to FIGS. 1 and/or 9. The embodiment of the 4-step contention based random access illustrated in FIG. 15A is for illustration only. FIG. 15A does not limit the scope of the present disclosure to any particular implementation.

FIG. 15B illustrates an example message flow diagram 1500 for 2-step contention based random access according to embodiments of the present disclosure. For example, the message flow diagram 1550 may be performed between BSs in a network such as any one of those discussed above with regard to FIGS. 1 and/or 9. The embodiment of the 2-step contention based random access illustrated in FIG. 15B is for illustration only. FIG. 15B does not limit the scope of the present disclosure to any particular implementation.

FIG. 15C illustrates an example message flow diagram 1570 for contention free random access according to embodiments of the present disclosure. For example, the message flow diagram 1507 may be performed between BSs in a network such as any one of those discussed above with regard to FIGS. 1 and/or 9. The embodiment of the contention free random access illustrated in FIG. 15C is for illustration only. FIG. 15C does not limit the scope of the present disclosure to any particular implementation.

In one embodiment, the contention based random access procedure can be a 4-step process as illustrated in FIG. 15A, and in another embodiment, it can be a 2-step process as illustrated in FIG. 15B. This parent BS may enable the new mesh BS to get connected to the core network or another BS. After association with the selected BS (parent), link metrics such as RSRP, RSRQ, RSSI, beam angle measurements etc. may be forwarded to the parent, which may further be forwarded to central processor. Here central processor can correspond to or be a part of a gateway BS or a central unit in a cloud RAN architecture or can be a new central processing entity to collect and process the measurement reports from the mesh BSs.

The new central processing entity may logically resides in one of existing network entities such as MME or the new central processing entity can be a new separated network entity from the existing ones. In another embodiment, full path cost from gateway BS to the new mesh BS may be forwarded to the central processor. Such cost metrics, for example, can be either computed at new mesh BS using the information in MIB/SIB.

The central processor may use the received link/path metrics to update a routing table of the central processor, the central processor may also compute other BSs that are likely to have a viable connection to the new mesh BS, based on, for example, the location estimates. The central processor may then coordinate a discovery procedure between the new mesh BS and one or more prospective parent BSs. The new mesh BS may then transmit the RSRP, RSRQ, RSSI etc. link metrics for the link to the prospective parent BSs, to the central processor via the current parent BS.

Using the link metrics such as RSRP, RSRQ, RSSI and beam information for these links, the central processor may then update a routing table of the central processor and identify a suitable updated parent BS and a route to the new mesh BS. In one embodiment of this centralized approach, some of the routing information such as: gateway BS indication, routing information and hardware capability information may be omitted from the NDSB MIB.

Figure 16:
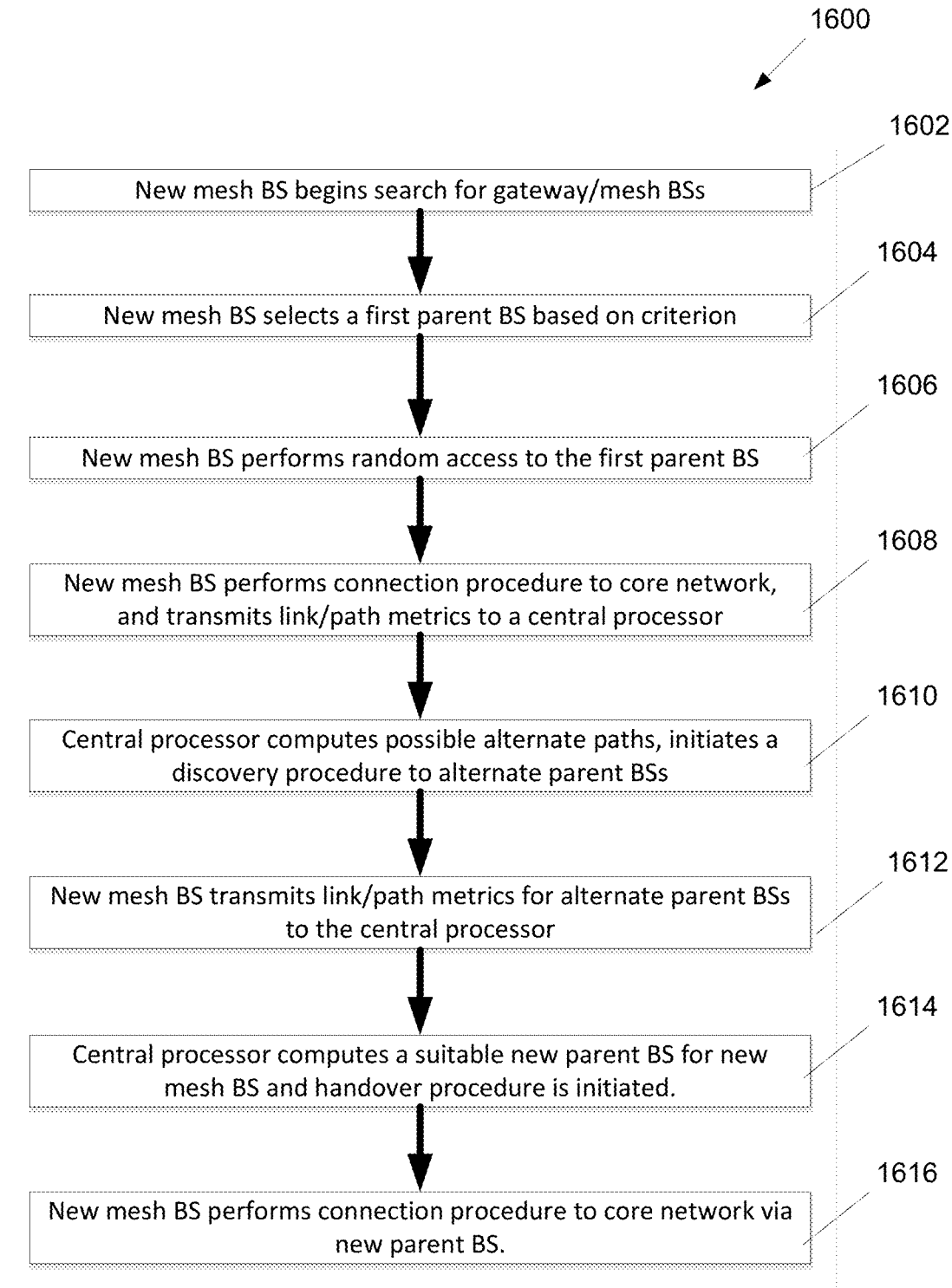
FIG. 16 illustrates a flowchart of a method for parent BS selection according to embodiments of the present disclosure.

FIG. 16 illustrates a flowchart of a method 1600 for parent BS selection according to embodiments of the present disclosure. For example, the method 1600 may be performed by a BS such as any one of those discussed above with regard to FIGS. 1 and/or 9. The embodiment of the method 1600 illustrated in FIG. 16 is for illustration only. FIG. 16 does not limit the scope of the present disclosure to any particular implementation.

As illustrated in FIG. 16, the method 1600 begins at step 1602. In step 1602, a new mesh BS begins search for gateway/mesh BSs. Subsequently, in step 1604, the new mesh BS selects a first parent BS based on criterion. Subsequently, in step 1606, the new mesh BS performs random access to the first parent BS. Subsequently, in step 1608, the new mesh BS performs connection procedure to core network and transmits link/path metrics to a central processor. Subsequently, in step 1610, a central processor computes possible alternate paths, initiates a discovery procedure to alternate parent BSs. Subsequently, in step 1612, the new mesh BS transmits link/path metrics for alternate parent BSs to the central processor. Next, in step 1614, the central processor computes a suitable new parent BS for new mesh BS and handover procedure is initiated. Finally, in step 1616, the new mesh BS performs connection procedure to core network via new parent BS.

In one embodiment, the new mesh BS may receive NDSBs from one or more BSs. By performing RSRP/RSRQ/RSSI measurements (enabled by signals contained in the NDSB) and using the routing information in the MIB/SIB of NDSB, the new mesh BS may itself determine a parent BS from the available BSs. In one embodiment, a new mesh BS determines overall best route to a gateway BS. The first-hop parent BS of the new mesh BS may or may not be the one having highest RRM metric (RSRP/RSRQ/RSSI) among those discovered during the neighbor discovery phase.

Figure 17:
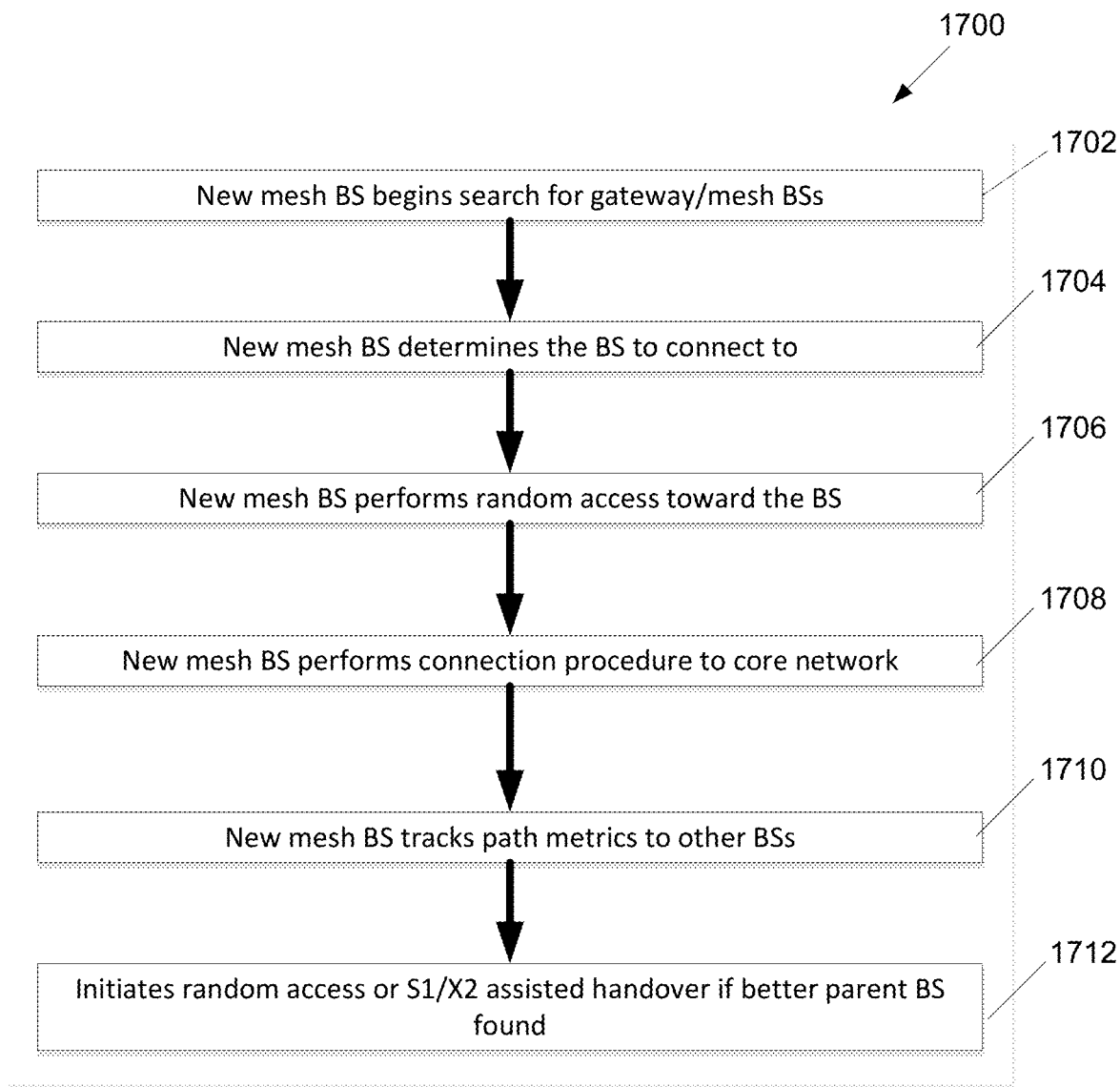
FIG. 17 illustrates a flowchart of a method for parent BS selection according to embodiments of the present disclosure.

FIG. 17 illustrates another flowchart of a method 1700 for parent BS selection according to embodiments of the present disclosure. For example, the method 1700 may be performed by a BS such as any one of those discussed above with regard to FIGS. 1 and/or 9. The embodiment of the method 1700 illustrated in FIG. 17 is for illustration only. FIG. 17 does not limit the scope of the present disclosure to any particular implementation.

As illustrated in FIG. 17, the method 1700 begins at step 1702. In step 1702, a new mesh BS begins search for gateway/mesh BSs. Subsequently, in step 1704, the new mesh BS determines the BS to connect to. Subsequently, in step 1706, the new mesh BS performs random access toward the BS. Subsequently, in step 1708, the new mesh BS performs connection procedure to core network. Next, in step 1710, the new mesh BS tracks path metrics to other BSs. Finally, in step 1712, the method 1700 initiates random access or S1/X2 assisted handover if better parent BS found.

Figure 18:
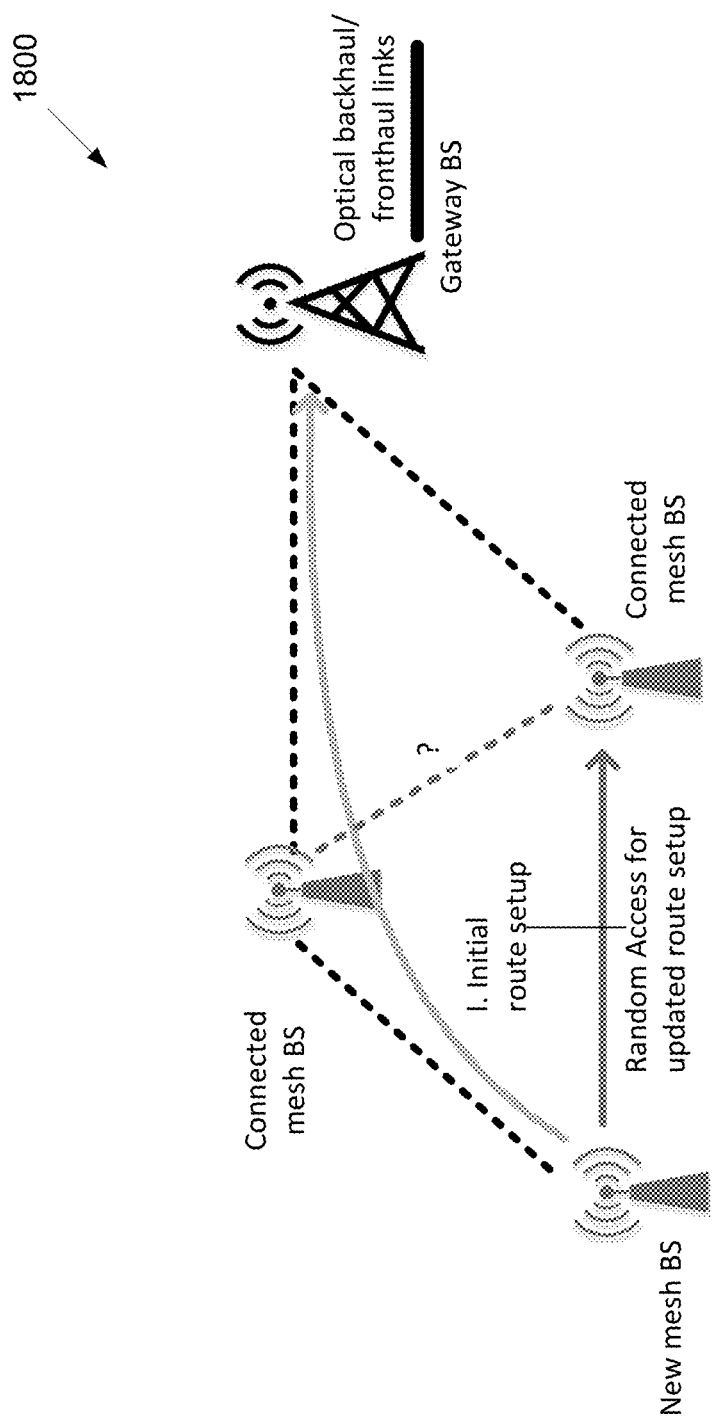
FIG. 18 illustrates an example of parent BS selection in a network according to embodiments of the present disclosure.

FIG. 18 illustrates an example of parent BS selection in a network 1800 according to embodiments of the present disclosure. For example, the network 1800 may be implemented in the network 900 in FIG. 9. The embodiment of the parent BS selection illustrated in FIG. 18 is for illustration only. FIG. 18 does not limit the scope of the present disclosure to any particular implementation.

Once the new mesh BS determined the best route to a gateway BS, the new mesh BS starts random access to the corresponding first-hop parent BS. This illustrates one of the differences between the centralized and decentralized approaches. The intelligence to determine the best route resides in each mesh BS and the new mesh BS determines a first-hop parent BS not only based on RRM metrics but also based on broadcasted routing information received in the NDSB. After the initial path establishment, the new mesh BS can continue to decode NDSBs from other BSs periodically or upon being triggered by a channel quality condition. Upon detecting a change in the best route (as an outcome of the NDSB measurements), the mesh BS can perform a contention-based random access to the new best parent BS. In an alternate approach, the mesh BS requests the current parent BS to initiate a S1/X2 handover to the new parent BS.

Figure 19A:
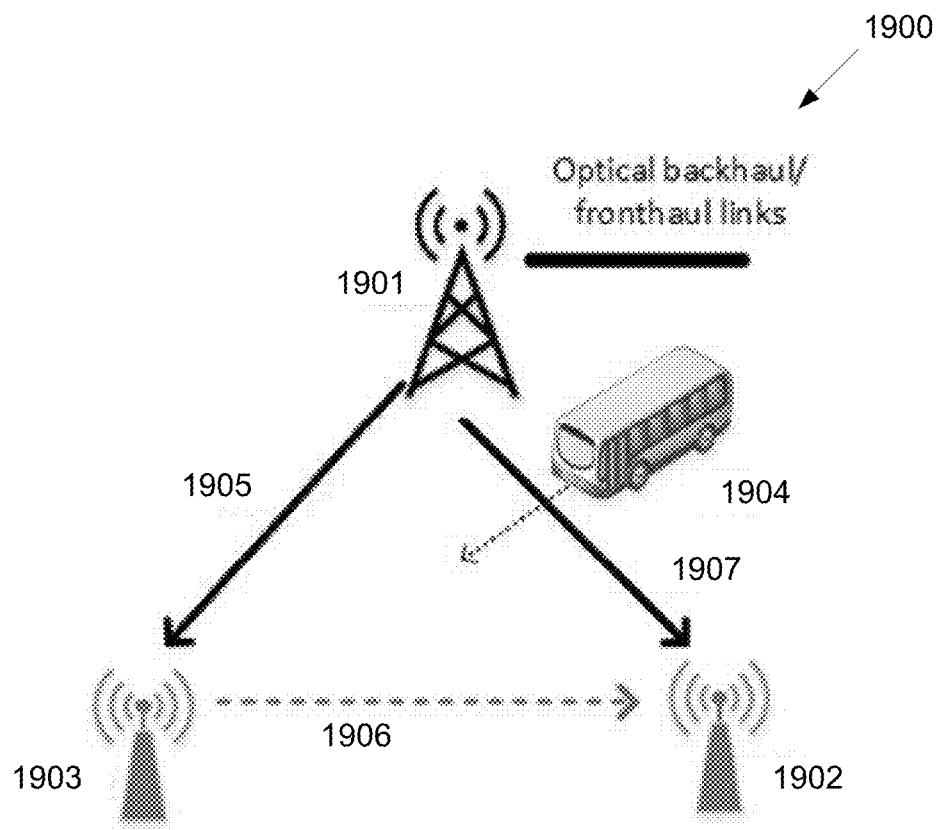
FIG. 19A illustrates an example of non-stationarity of mesh links and neighborhood knowledge in a network according to embodiments of the present disclosure.

FIG. 19A illustrates an example of non-stationarity of mesh links and neighborhood knowledge in a network 1900 according to embodiments of the present disclosure. For example, the network 1900 may be implemented in the network 900 in FIG. 9. The embodiment of the non-stationarity of mesh links and neighborhood knowledge illustrated in FIG. 19A is for illustration only. FIG. 19A does not limit the scope of the present disclosure to any particular implementation.

Figure 19B:
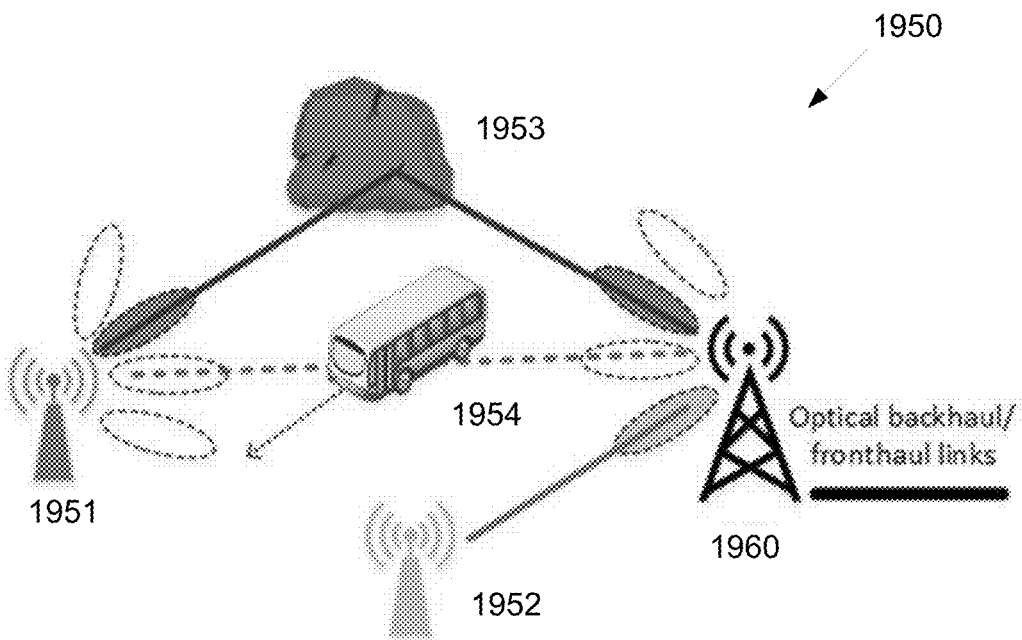
FIG. 19B illustrates an example of non-stationarity of mesh links and neighborhood knowledge in a network according to embodiments of the present disclosure.

FIG. 19B illustrates an example non-stationarity of mesh links and neighborhood knowledge in a network 1950 according to embodiments of the present disclosure. For example, the network 1950 may be implemented in the network 900 in FIG. 9. The embodiment of the non-stationarity of mesh links and neighborhood knowledge illustrated in FIG. 19B is for illustration only. FIG. 19B does not limit the scope of the present disclosure to any particular implementation.

Wireless channels are typically time varying and are thus characterized by a coherence time. This variation may be due to mobility of the transmitter/receiver/scatterers in the channel and/or due to non-stationarity of the radio-frequency hardware at the transmitter or receiver. Since typical mesh BSs may have a low antenna height and thus may be more likely to be influenced by local scattering, this temporal variation might be more pronounced in mesh networks. The variation may be even more pronounced in mesh networks operating at the mm-wave and THz frequencies due to the high blockage probability. Consequently, the signal strength between different mesh BSs may vary with time, thus possibly requiring a procedure to update neighborhood connectivity information in a mesh network. Such information can be utilized, for example, for quick handover to a different parent BS upon link failure or for updating the transmit/receive beams to existing parent/child BSs as illustrated in FIGS. 19A and B.

As illustrated in FIG. 19A, the direct link 1907 between a gateway BS 1901 and a mesh BS 1902 may get blocked by a mobile obstacle 304 at a certain time. When this happens, the traffic from 1901 to 1902 has to be routed via a BS 1903. Knowledge of the non-serving BS link 1906 strength at a BS 1902 enables a hand-over of 1902 from a BS 1901 to a BS 1903.

Similarly, as illustrated in FIG. 19B, the line-of-sight link between BSs 1960 and 1951 maybe initially blocked by an obstacle and hence a reflected path may be in use for communication. However, this obstacle may disappear at a certain time, allowing better link quality if transmit/receive beams are updated at the BS 1960 and the BS 1951. This beam update enabled by knowledge of alternate paths from the BS 1960 (e.g. parent BS) at the BS 1911 (e.g., child BS) and vice versa. The present disclosure provides embodiments on procedures for such neighboring (serving/non-serving) BS discovery and measurement.

Figure 20:
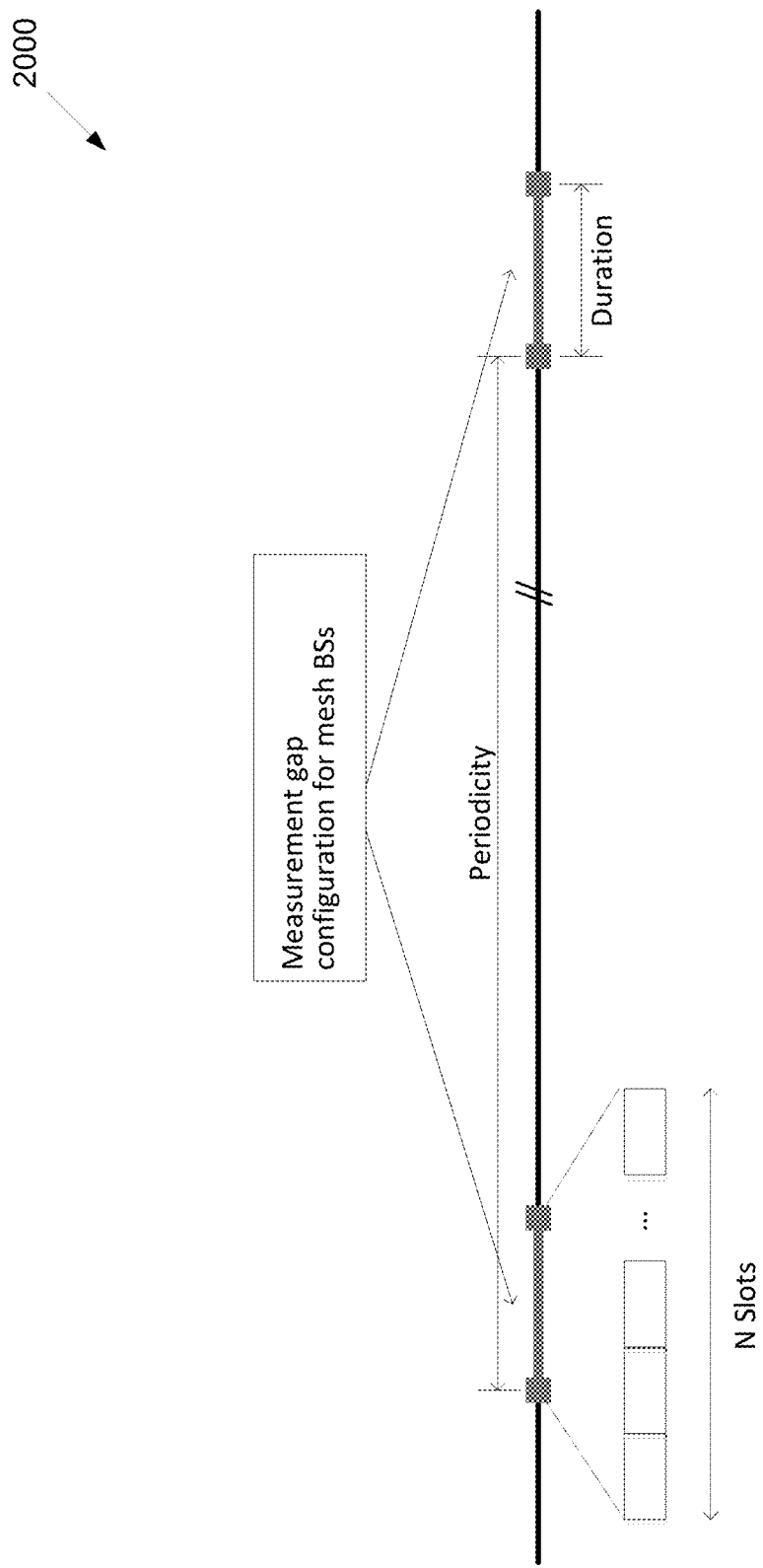
FIG. 20 illustrates an example of a measurement gap configuration according to embodiments of the present disclosure.

FIG. 20 illustrates an example of a measurement gap configuration 2000 according to embodiments of the present disclosure. The embodiment of the measurement gap 2000 illustrated in FIG. 20 is for illustration only. FIG. 20 does not limit the scope of the present disclosure to any particular implementation.

In various embodiments, a measurement gap is provided, where the neighborhood connectivity strengths are measured by the mesh BSs. In one embodiment, the measurement gap may be periodic, as illustrated in FIG. 20.

As illustrated in FIG. 20, in one embodiment, a measurement gap has a duration that includes N slots. In one embodiment, the repetition period, measurement duration and N may be fixed, while in another embodiment, the repetition period, measurement duration and N may be configured by an existing or new entity in the core network (CN) or radio access network (RAN), such as for example a gateway BS, in either a dynamic or a semi-static manner via layer 1 (L1) or radio resource control (RRC) signaling.

In one embodiment, the gateway BS may initiate and configure the measurement gap, and the information may be passed down to all child BSs. This can ensure synchronous measurement gaps at all the BSs associated with the same gateway BS. A mesh BS that receives measurement configurations from multiple source gateway BS may maintain multiple measurement gap configurations and can participate in all of them, in a subset of them, or may cycle between the different configurations.

In one example, a mesh BS hears measurement configurations from gateway BSs $\mathcal{L} = \{1, \ldots, L\}$. A mesh BS may participate in measurement gap of Gateway BS1 first. After waiting for an optional backoff time (to limit overhead of the measurement gaps), the mesh BS may then participate in the earliest arriving measurement gap not belonging to gateway BS1. The mesh BS may then follow a round robin approach where a previously used measurement gap may not be used until all gateway BSs in $\mathcal{L}$ are covered. In another embodiment, the measurement gap may be jointly configured for multiple gateway BSs either by a CN entity, such as the mobility management entity or by a BS or a RAN controlling entity.

In such a measurement gap, each configured BS may transmit a synchronization signal block (SSB) in a fraction of the N slots while listening for SSBs from other BSs in the remaining slots. During transition of SSB, a BS may not be able to detect an SSB from a neighboring BS. If a BS is capable of full duplexing, the BS may be able to detect an SSB from other BS(s) while the BS is also transmitting the SSB. Thus, the neighboring mesh BSs may take turns to transmit their SSBs. Furthermore, since the mesh BSs may have multiple antennas with a hybrid architecture, beam sweeping may be required at both the transmitter and receiver to obtain the SSB with sufficient link margin. Since data transmission may be interrupted during the measurement gap, a large measurement gap may reduce system throughput and increases the system latency.

Descendant BS of a gateway BS may be defined as a mesh BS which gains access to the core network via that gateway BS. In one embodiment, the gateway BS assigns the order of transmission of descendant mesh BSs of the gateway BS. The mesh BSs may transmit the SSB in their assigned slots and listen for SSBs from other BSs in the remainder of the N slots. Within each slot, an assigned BS may transmit SSB along different beams via beam sweeping, in which different beam directions may be applied at different times in either periodic/regular intervals, or on different frequency/code resources.

Figure 21:
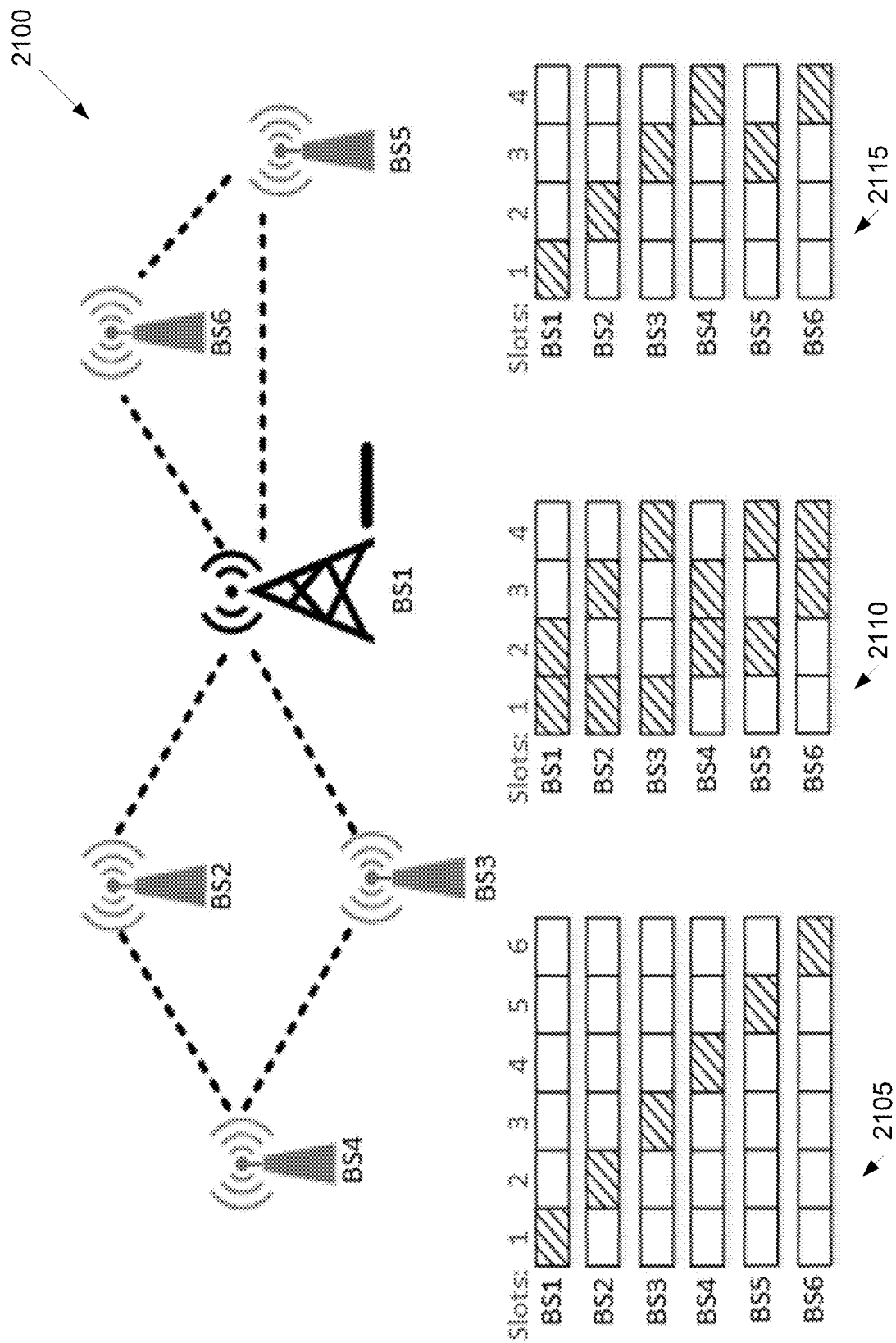
FIG. 21 illustrates an example of transmission pattern assignment by gateway BS in a network according to embodiments of the present disclosure.

FIG. 21 illustrates an example of transmission pattern assignment by a gateway BS in a network 2100 according to embodiments of the present disclosure. For example, the network 2100 may be implemented in the network 900 in FIG. 9. The embodiment of the transmission pattern assignment by gateway BS illustrated in FIG. 21 is for illustration only. FIG. 21 does not limit the scope of the present disclosure to any particular implementation.

For each SSB transmitting beam by a BS, the remaining BSs may perform receive beam sweeping. In one embodiment, each mesh BS may be assigned an exclusive transmission slot, as illustrated in FIG. 21 (e.g., pattern 2105).

In another embodiment, each mesh BS may be assigned to transmit in k out-of-the N slots, with the slot subset being distinct for each descendant BS as illustrated in FIG. 21 (e.g., pattern 2110). Furthermore, the SSBs of different mesh BSs sharing same transmission slots may be assigned different frequency/code resources. In another embodiment, each mesh BS may be assigned to transmit in k out-of-the N slots, with the slot subset being distinct for each descendant BS and each two subsets having at most l slots in common. This may help each mesh BS measure the SSB from another mesh BS in at least k–l slots, thus reducing false-alarm or mis-detection probabilities. Such an assignment can be obtained, for example, through combining with an l-overlapping k-intersecting sets.

In another embodiment, the gateway BS may assign transmission patterns to the descendant BSs. In one example, the gateway BS can use the received signal strength indication (RSSI), reference signal received power (RSRP), reference signal received quality (RSRQ), beam direction information etc. for the links from the descendant mesh BSs to their respective parent BSs. In one embodiment, the gateway BS can assign the same transmission pattern to multiple mesh BSs that are inferred to be far apart or separated in spatial domain, thus enabling spatial reuse and reducing the required number of slots N. An example for this embodiment is illustrated in FIG. 21 (e.g. pattern 2115).

Figure 22:
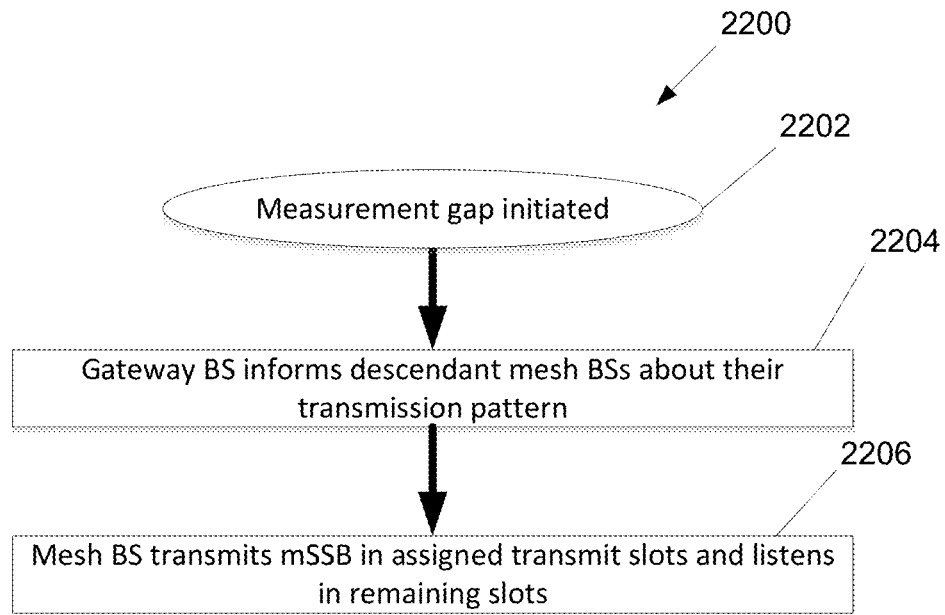
FIG. 22 illustrates a flowchart of a method for measurement gap configuration according to embodiments of the present disclosure.

FIG. 22 illustrates a flow chart of a method 2200 for measurement gap according to embodiments of the present disclosure. For example, the method 2200 may be performed by a network entity such as any one of those discussed above with regard to FIGS. 1 and/or 9. The embodiment of the method 2200 illustrated in FIG. 22 is for illustration only. FIG. 22 does not limit the scope of the present disclosure to any particular implementation.

As illustrated in FIG. 22, the method 2200 begins at step 2202. In step 2202, measurement gap is initiated. Subsequently, in step 2204, a gateway BS informs descendant mesh BSs about their transmission pattern. Finally, in step 2206, a mesh BS transmits mSSB in assigned transmit slots and listens in remaining slots.

A flow diagram of the aforementioned embodiments is illustrated in FIG. 22. In one embodiment, a conflict graph can be created based on the distance between mesh BSs and/or boresight information. A distance threshold can be introduced to help the gateway BS decide whether there is an edge between two vertex (mesh BSs) in the conflict graph. If the distance between two mesh BS is larger than a threshold, there is an edge between these two vertex; otherwise, there is no edge. After a gateway obtaining the conflict graph information of descendant BSs, a graph coloring algorithm can be executed on the conflict graph and mesh BSs with the same color could be assigned with the same transmission pattern.

In various embodiments, for the centralized measurement gap configuration, a parent mesh BS can configure measurement gap and SSB transmission schedule to child mesh BSs of the parent BSs. In some embodiments, child mesh BSs may have multiple measurement gap and SSB transmission schedule configurations. The SSB transmission schedule configuration may include SSB transmission periodicity, transmission pattern within a period including but not limited to SSB index, repetition factor, subcarrier spacing, frequency information, e.g., BWP over which the SSB is to be transmitted. The measurement gap configuration may include neighboring BS lists which are scheduled to transmit SSB during the gap including SSB transmission schedule.

Figure 23:
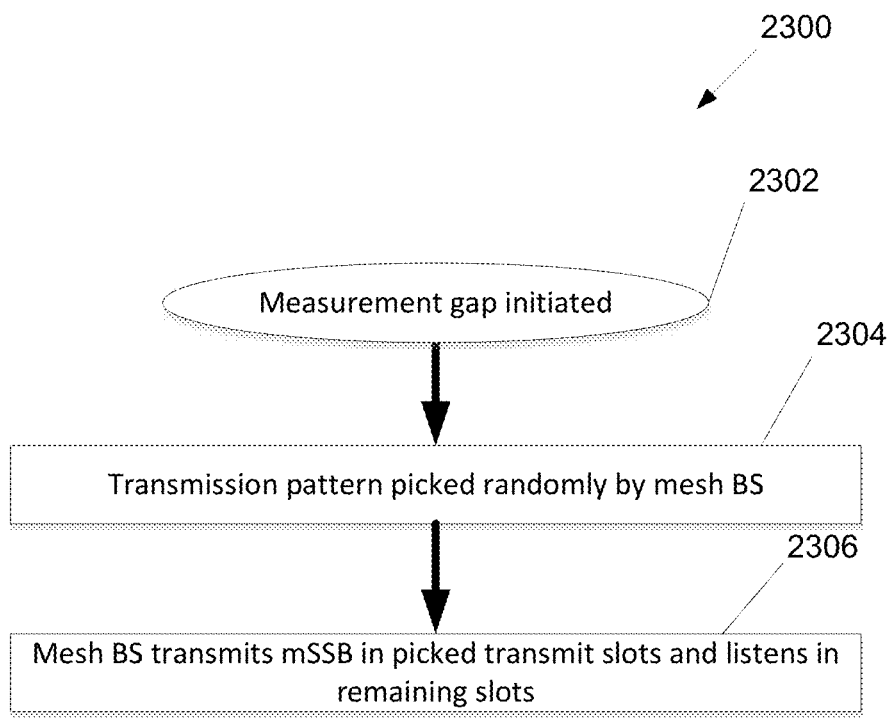
FIG. 23 illustrates flowchart of a method for measurement gap configuration according to embodiments of the present disclosure.

FIG. 23 illustrates another flowchart of a method 2300 for measurement gap according to embodiments of the present disclosure. For example, the method 2300 may be performed by a network entity such as any one of those discussed above with regard to FIGS. 1 and/or 9. The embodiment of the method 2300 illustrated in FIG. 23 is for illustration only. FIG. 23 does not limit the scope of the present disclosure to any particular implementation.

As illustrated in FIG. 23, the method 2300 begins at step 2302. In step 2302, measurement gap is initiated. Next, in step 2304, transmission pattern is picked randomly by mesh BS. Finally, in step 2306, mesh BS transmits the mSSB in selected transmit slots and listens in remaining slots.

Figure 24:
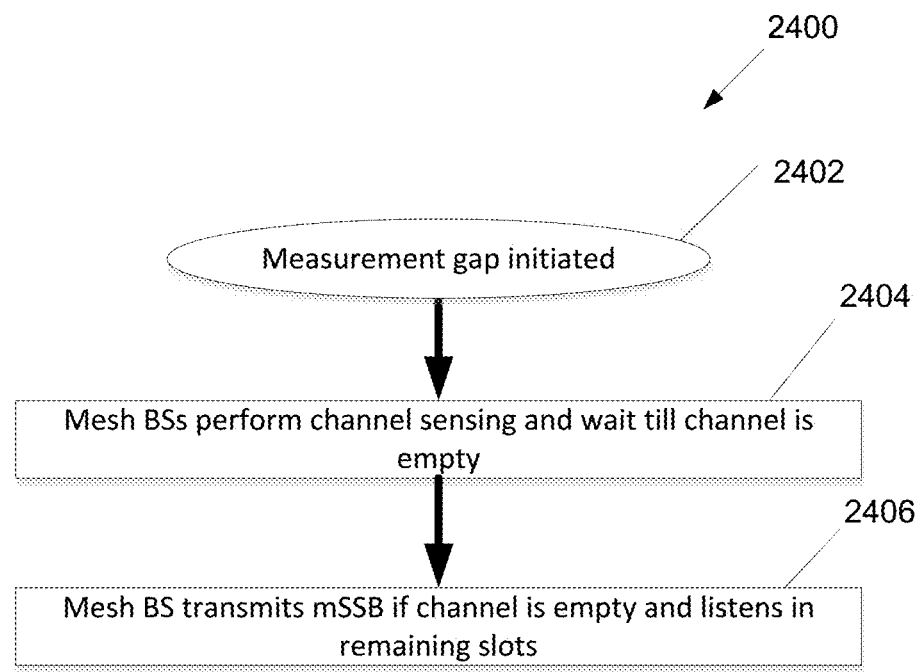
FIG. 24 illustrates a flowchart of a method for measurement gap configuration according to embodiments of the present disclosure.

FIG. 24 illustrates yet another flow chart of a method 2400 for measurement gap according to embodiments of the present disclosure. For example, the method 2400 may be performed by a network entity such as any one of those discussed above with regard to FIGS. 1 and/or 9. The embodiment of the method 2400 illustrated in FIG. 24 is for illustration only. FIG. 24 does not limit the scope of the present disclosure to any particular implementation.

As illustrated in FIG. 24, the method 2400 begins at step 2402. In step 2402, measurement gap is initiated. Next, in step 2404, mesh BSs perform channel sensing and wait till channel is empty. Finally, in step 2406, a mesh BS transmits mSSB if channel is empty and listens in remaining slots.

In one embodiment, the BSs associated with a measurement gap may transmit on each slot with a probability of $p_{tx}$. On the non-transmitting slots, the BSs may listen for SSBs from neighboring BSs. In another embodiment, a dictionary of transmission patterns may be provided to each mesh BS, and each mesh BS may pick one pattern from the dictionary in a random, pseudo-random or a predefined manner or based on a signalling from gateway BS. Such a dictionary may encompass, for example, all patterns that transmit on k out-of-the N slots, or patterns that transmit on k out-of-the N slots such that no two patterns have more than l slots in common. In one embodiment, the transmission pattern used by a BS in each measurement gap may be different or chosen at random to ensure that all neighbors are discovered with good probability after a few measurement gaps.

In one embodiment, the BSs associated with a measurement gap may perform channel sensing, and transmit a SSB if no SSB transmission from another BS is detected above a threshold power of $D_{th}$ during sensing. In one embodiment, if a channel occupancy is observed, a random backoff may be used. In another embodiment, no random backoff is used, and transmission may be initiated as soon as the channel is observed to be empty.

Figure 25:
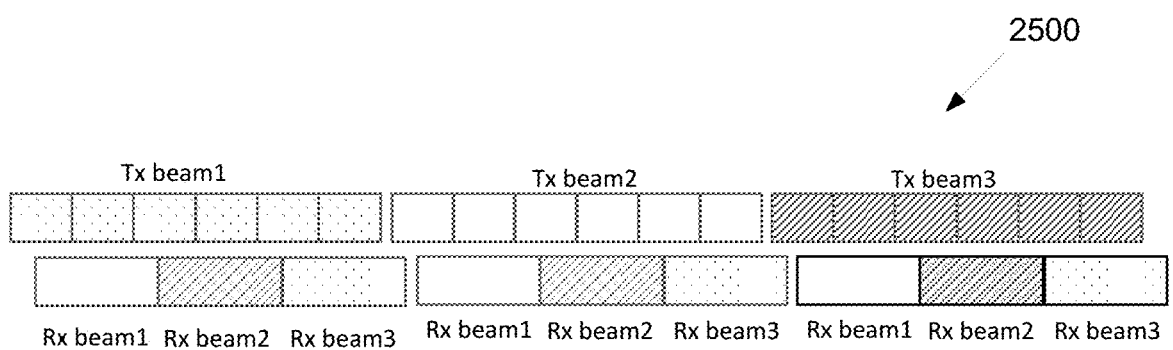
FIG. 25 illustrates an example of beam sweeping patterns according to embodiments of the present disclosure.

FIG. 25 illustrates an example of beam sweeping patterns 2500 according to embodiments of the present disclosure. The embodiment of the beam sweeping patterns 2500 illustrated in FIG. 25 is for illustration only. FIG. 25 does not limit the scope of the present disclosure to any particular implementation.

In various embodiments, the BSs may perform unsynchronized beam sweeping for both transmitting and receiving SSBs. To enable the detection of SSBs in such scenarios, many SSBs may be transmitted by a BS along each transmit beam, and an observation time spanning multiple SSBs may be used at each BS for each receive beam, as illustrated in FIG. 25. This may allow detection of an SSB within each receive beam observation time even with a timing offset between the transmitter and receiver, as illustrated in FIG. 25.

In one embodiment, a special packet or field may be defined to inform the associated UEs or child mesh BSs about temporary interruption of service due to the measurement gap. In another embodiment, measurement gap configuration is sent to associated UEs or child mesh BSs. In another embodiment, communication with UE during the measurement gap can be avoided by using appropriate downlink/uplink scheduling and channel state information reference signal (CSI-RS) configurations.

Figure 26:
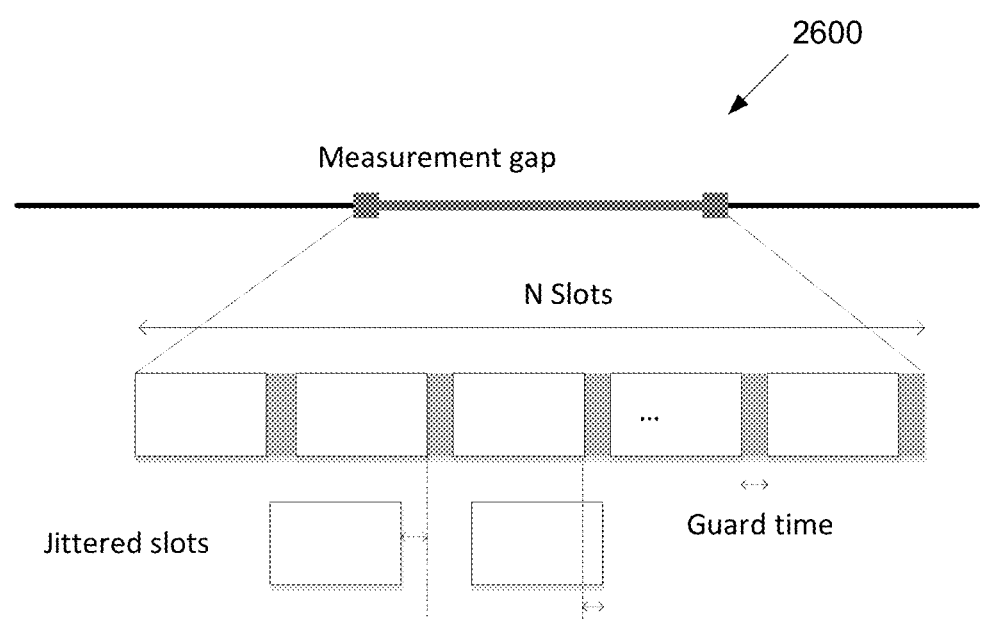
FIG. 26 illustrates an example of guard time in a measurement gap configuration according to embodiments of the present disclosure.

FIG. 26 illustrates an example of the use of guard time in a measurement gap configuration 2600 according to embodiments of the present disclosure. For example, the guard time in the measurement gap configuration 2600 may be used in connection with the measurement gap configuration 2000 in FIG. 20. The embodiment of the guard time in measurement gap 2600 illustrated in FIG. 26 is for illustration only. FIG. 26 does not limit the scope of the present disclosure to any particular implementation.

The aforementioned embodiments may require a slot level synchronization among the descendant BSs of a gateway BS. A timing offset or jitter between the different mesh BSs may cause the SSBs to overlap across slots and cause collisions between SSBs from different mesh BSs. To compensate for such timing mismatches between the different BSs, in one embodiment of the measurement gap, a guard time may be provided between each of the N slots as illustrated in FIG. 26.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined only by the claims.

What is claimed is:

1. A base station (BS) in a wireless communication network, the BS comprising:
a processor configured to:
generate measurement information regarding neighboring BSs of the BS in the wireless communication network,
determine a first parent BS of the neighboring BSs to connect to based on the measurement information,
perform an initial access procedure with the first parent BS to connect to the first parent BS, and
identify an end-to-end route for the BS for transfer of data between a user equipment (UE) and a gateway via the wireless communication network; and
a transceiver operably connected to the processor, the transceiver configured to:
transfer the data between the gateway and the UE based on the identified end-to-end route, and
receive a configuration of a measurement gap,
wherein the processor is further configured to identify the configuration of the measurement gap for transmission of a measurement signal including a synchronization signal block (SSB), and
wherein the transceiver is configured to transmit the measurement signal including the SSB based on the identified measurement gap configuration.

2. The BS of claim 1, wherein:
the transceiver is configured to transmit the measurement information to the gateway via the first parent BS after connecting to the first parent BS,
the processor is configured to:
identify the end-to-end route based on routing information received from the gateway or a central network controller after connecting to the first parent BS, the end-to-end route determined at least in part based on the transmitted measurement information, the identified end-to-end route including a second parent BS for the BS, and
switch from connection to the first parent BS to the second parent BS for the data transfer.

3. The BS of claim 1, wherein the processor is configured to:
determine the end-to-end route based on the measurement information and routing information received from one or more of the neighboring BSs, and
select the first parent BS to connect to prior to performing the initial access procedure based on the determined end-to-end route.

4. The BS of claim 1, wherein:
the transceiver is configured to receive neighbor discovery messages from multiple BSs, respectively, of the neighboring BSs, and
the processor is configured to select the first parent BS to perform the initial access procedure with from among the multiple BSs based on receipt of one of the neighbor discovery messages from the first parent BS.

5. The BS of claim 4, wherein:
the neighbor discovery message received from the first parent BS includes one or more reference signals to use to generate the measurement information, an indication of mesh network capability of the first parent BS, an indication of the gateway, random access resource information for performing the initial access procedure, and routing information regarding connected BSs in the wireless communication network, and
the processor is configured to use the received neighbor discovery message to perform the initial access procedure.

6. The BS of claim 1, wherein: the measurement gap has a duration of N slots.

7. The BS of claim 6, wherein:
the processor is configured to identify at least one of the N slots for the transmission of the measurement signal including the SSB during the measurement gap based on the received measurement gap configuration, and
the transceiver is configured to transmit the measurement signal including the SSB during the identified at least one of the N slots and to listen for SSBs of other BSs in the wireless communication network during other of the N slots.

8. The BS of claim 6, wherein:
the processor is configured to determine at least one of the N slots for the transmission of the measurement signal including the SSB during the measurement gap based on a transmit probability for each of the N slots, and
the transceiver is configured to transmit the measurement signal including the SSB during the determined at least one of the N slots and to listen for SSBs of other BSs in the wireless communication network during other of the N slots.

9. The BS of claim 6, wherein:
the processor is configured to perform a sensing operation during the measurement gap to determine whether a received SSB transmission of other BSs in the wireless communication network are higher than a threshold during the N slots, and
the transceiver is configured to transmit the measurement signal including the SSB during at least one of the N slots where no received SSB transmission of the other BSs is higher than the threshold and to listen for SSBs of other BSs in the wireless communication network during other of the N slots.

10. The BS of claim 6, wherein:
the transceiver is configured to:
receive, from a parent BS of the BS in the wireless communication network, the measurement gap configuration and an SSB transmission schedule, and
transmit the measurement signal including the SSB during the measurement gap based on the received SSB transmission schedule; and
the measurement gap includes an indication of neighbor BSs of the of the BS in the wireless communication network that are also scheduled to transmit SSBs during the measurement gap.

11. A method for operating a base station (BS) in a wireless communication network, the method comprising:
generating measurement information regarding neighboring BSs of the BS in the wireless communication network;
determining a first parent BS of the neighboring BSs to connect to based on the measurement information;
performing an initial access procedure with the first parent BS to connect to the first parent BS;
identifying an end-to-end route for the BS for transfer of data between a user equipment (UE) and a gateway via the wireless communication network;
transferring the data between the gateway and the UE based on the identified end-to-end route;
receiving a configuration of a measurement gap;
identifying the configuration of the measurement gap for transmission of a measurement signal including a synchronization signal block (SSB); and
transmitting the measurement signal including the SSB based on the identified measurement gap configuration.

12. The method of claim 11, further comprising:
transmitting the measurement information to the gateway via the first parent BS after connecting to the first parent BS,
wherein identifying the end-to-end route comprises identifying the end-to-end route based on routing information received from the gateway or a central network controller after connecting to the first parent BS, wherein the end-to-end route determined at least in part based on the transmitted measurement information, and wherein the identified end-to-end route including a second parent BS for the BS, the method further comprising:
switching from connection to the first parent BS to the second parent BS for the data transfer.

13. The method of claim 11, wherein:
identifying the end-to-end route comprises determining the end-to-end route based on the measurement information and routing information received from one or more of the neighboring BSs, and
selecting the first parent BS to connect to prior to performing the initial access procedure based on the determined end-to-end route.

14. The method of claim 11, further comprising:
receiving neighbor discovery messages from multiple BSs, respectively, of the neighboring BSs; and
selecting the first parent BS to perform the initial access procedure with from among the multiple BSs based on receipt of one of the neighbor discovery messages from the first parent BS.

15. The method of claim 14, wherein:
the neighbor discovery message received from the first parent BS includes one or more reference signals to use to generate the measurement information, an indication of mesh network capability of the first parent BS, an indication of the gateway, random access resource information for performing the initial access procedure, and routing information regarding connected BSs in the wireless communication network, and
performing an initial access procedure comprises using the received neighbor discovery message to perform the initial access procedure.

16. The method of claim 11, wherein the measurement gap has a duration of N slots.

17. The method of claim 16, further comprising:
identifying at least one of the N slots for the transmission of the measurement signal including the SSB during the measurement gap based on the received measurement gap configuration; and
listening for SSBs of other BSs in the wireless communication network during other of the N slots,
wherein transmitting the measurement signal comprises transmitting the measurement signal including the SSB during the identified at least one of the N slots.

18. The method of claim 16, further comprising:
determining at least one of the N slots for the transmission of the measurement signal including the SSB during the measurement gap based on a transmit probability for each of the N slots;
transmitting the measurement signal including the SSB during the determined at least one of the N slots; and
listening for SSBs of other BSs in the wireless communication network during other of the N slots.

19. The method of claim 16, further comprising:
performing a sensing operation during the measurement gap to determine whether a received SSB transmission of other BSs in the wireless communication network are higher than a threshold during the N slots;
transmitting the measurement signal including the SSB during at least one of the N slots where no received SSB transmission of the other BSs is higher than the threshold; and
listening for SSBs of other BSs in the wireless communication network during other of the N slots.

20. The method of claim 16, further comprising:
receiving, from a parent BS of the BS in the wireless communication network, the measurement gap configuration and an SSB transmission schedule; and
transmitting the measurement signal including the SSB during the measurement gap based on the received SSB transmission schedule,
wherein the measurement gap includes an indication of neighbor BSs of the of the BS in the wireless communication network that are also scheduled to transmit SSBs during the measurement gap.

* * * * *